United States Patent
Fujii

(10) Patent No.: US 10,502,567 B2
(45) Date of Patent: Dec. 10, 2019

(54) ROLL ANGLE ESTIMATION DEVICE AND TRANSPORT APPARATUS

(71) Applicant: YAMAHA HATSUDOKI KABUSHIKI KAISHA, Iwata-shi, Shizuoka-ken (JP)

(72) Inventor: Takahiro Fujii, Iwata (JP)

(73) Assignee: YAMAHA HATSUDOKI KABUSHIKI KAISHA, Iwata-Shi (JP)

( * ) Notice: Subject to any disclaimer, the term of this patent is extended or adjusted under 35 U.S.C. 154(b) by 481 days.

(21) Appl. No.: 14/693,092

(22) Filed: Apr. 22, 2015

(65) Prior Publication Data

US 2015/0308827 A1 Oct. 29, 2015

(30) Foreign Application Priority Data

Apr. 25, 2014 (JP) ................. 2014-091519

(51) Int. Cl.
*G01C 19/00* (2013.01)
*G01P 3/44* (2006.01)
(Continued)

(52) U.S. Cl.
CPC ............. *G01C 19/00* (2013.01); *B60W 40/11* (2013.01); *B60W 40/112* (2013.01); *G01P 3/44* (2013.01);
(Continued)

(58) Field of Classification Search
CPC ........ G01C 19/00; B60W 40/112; G01P 3/44; G01P 21/00
(Continued)

(56) References Cited

U.S. PATENT DOCUMENTS 6,192,305 B1 2/2001 Schiffmann
6,330,483 B1 * 12/2001 Dailey ..................... G05B 5/01
318/561
(Continued)

FOREIGN PATENT DOCUMENTS

EP 1002709 A2 5/2000
EP 2517941 A1 10/2012
(Continued)

OTHER PUBLICATIONS

J.T. Gillis "Estimation of 3-D Angular Motion Using Gyroscopes and Linear Accelerometers", IEEE 1RANSACTIONS on Aerospace and Electronic Systems vol. 27, No. 6 Nov. 1991 (See p. 911 right col. line 4-6: angular sensors, linear sensors.*
(Continued)

*Primary Examiner* — Janet L Suglo
*Assistant Examiner* — Douglas Kay
(74) *Attorney, Agent, or Firm* — Rabin & Berdo, P.C.

(57) ABSTRACT

Arithmetic circuitry of a roll angle estimation device estimates a roll angle, a pitch angle a pitch angular velocity of the moving body and at least one offset error of angular velocity detectors and acceleration detectors. In a current estimation operation, the arithmetic circuitry estimates the roll angle, the pitch angle, and the pitch angular velocity and the at least one offset error, based on detection values of the angular velocity detectors, detection values of the acceleration detectors, a detection value by the velocity detector, estimated values of the roll angle, pitch angle, and pitch angular velocity from a previous estimation operation, and an estimated value of the at least offset error from the previous estimation operation.

18 Claims, 10 Drawing Sheets

(51) Int. Cl.
*G01P 21/00* (2006.01)
*B60W 40/112* (2012.01)
*B60W 40/11* (2012.01)
B60W 50/00 (2006.01)
B60W 50/02 (2012.01)

(52) U.S. Cl.
CPC ........ *G01P 21/00* (2013.01); *B60W 2050/002* (2013.01); *B60W 2050/005* (2013.01); *B60W 2050/0013* (2013.01); *B60W 2050/0027* (2013.01); *B60W 2050/0056* (2013.01); *B60W 2050/0215* (2013.01); *B60W 2300/36* (2013.01); *B60W 2420/905* (2013.01); *B60W 2520/10* (2013.01); *B60W 2520/105* (2013.01); *B60W 2520/125* (2013.01); *B60W 2520/16* (2013.01); *B60W 2520/18* (2013.01); *B60W 2520/28* (2013.01); *B60Y 2200/12* (2013.01)

(58) Field of Classification Search
USPC ....................................................... 702/151
See application file for complete search history.

(56) References Cited

U.S. PATENT DOCUMENTS

| | | | | |
|---|---|---|---|---|
| 9,630,672 | B2* | 4/2017 | Inoue | B62J 27/00 |
| 2003/0058118 | A1* | 3/2003 | Wilson | B60C 23/0423 |
| | | | | 340/679 |
| 2008/0285805 | A1* | 11/2008 | Luinge | A61B 5/1114 |
| | | | | 382/107 |
| 2010/0141261 | A1* | 6/2010 | Overby | G01V 3/12 |
| | | | | 324/329 |
| 2010/0168958 | A1 | 7/2010 | Baino | |
| 2011/0040464 | A1* | 2/2011 | Ono | G01C 19/00 |
| | | | | 701/70 |
| 2012/0136573 | A1* | 5/2012 | Janardhanan | G01C 21/165 |
| | | | | 701/512 |
| 2012/0259526 | A1* | 10/2012 | Inoue | B60W 40/112 |
| | | | | 701/70 |
| 2013/0043816 | A1* | 2/2013 | Welchko | H02P 27/08 |
| | | | | 318/400.21 |
| 2013/0231838 | A1* | 9/2013 | Shiozawa | B60L 3/102 |
| | | | | 701/70 |

FOREIGN PATENT DOCUMENTS

| | | | |
|---|---|---|---|
| JP | 2009-073466 | A | 4/2009 |
| JP | 2009073466 | A * | 4/2009 |
| JP | 2010-070184 | A | 4/2010 |
| JP | 2010-143379 | A | 7/2010 |
| JP | 2010-149681 | A | 7/2010 |
| JP | 2011-128093 | A | 6/2011 |
| WO | WO-2011/077626 | A1 | 6/2011 |

OTHER PUBLICATIONS

J. L. Marins and at el, "An Extended Kalman Filter for Quaternion-Based Orientation Estimation Using MARG Sensors", Proceedings of the Zoo1 EEE/RSJ International Conference on Intelligent Robots and Systems M&, Haw& USA, Oct. 29-Nov. 3, 2001.*

J. M. Roberts, "Low-Cost Flight Control System fora Small Autonomous Helicopter", Proceedings of tho 1003 IEEE International Conference on Robotics & Automstion Taipei, Tairxo, Sep. 14-19, 2003 (Year: 2003).*

* cited by examiner

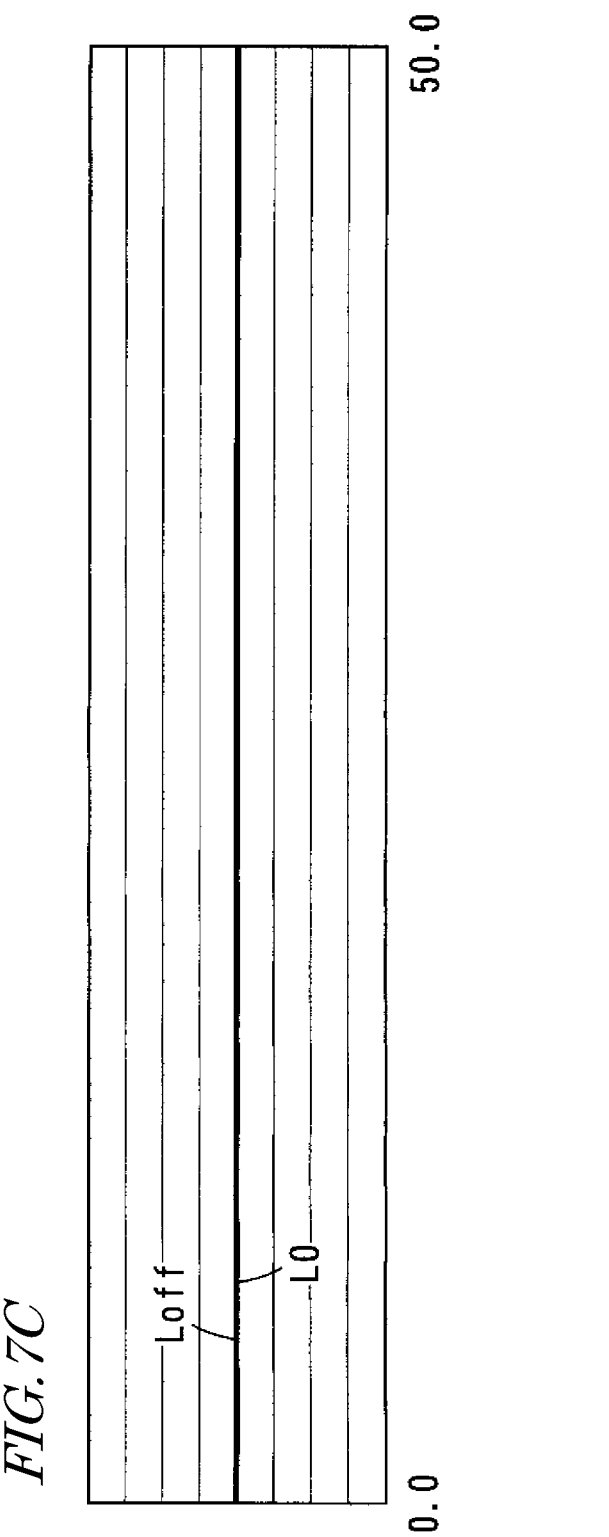

ROLL ANGLE ESTIMATION DEVICE AND TRANSPORT APPARATUS

CROSS-REFERENCE TO RELATED APPLICATION

This application is based on Japanese Patent Application No. 2014-091519 filed on Apr. 25, 2014, the entire contents of which are hereby incorporated by reference.

BACKGROUND

1. Technical Field

The present invention relates to a roll angle estimation device, and a transport apparatus including the same.

2. Description of the Related Art

Various estimation devices for estimating the roll angle of a vehicle such as a motorcycle have conventionally been proposed. For example, by controlling the orientation of a headlight based on a roll angle which is estimated by an estimation device, it becomes possible to radiate light in an appropriate direction with the headlight, regardless of vehicle inclination.

In a vehicle attitude estimation apparatus described in Japanese Laid-Open Patent Publication No. 2009-73466, a roll angle and a pitch angle are estimated based on detected values of longitudinal acceleration, lateral acceleration, vertical acceleration, yaw acceleration, and roll angular velocity of the vehicle motion, as well as an estimated value of longitudinal vehicle speed and an estimated value of pitch angular velocity.

However, conventional estimation devices needed more improvement in terms of accuracy of estimation of the vehicle roll angle. For example, the headlight orientation may become tilted even though the vehicle is not inclined.

SUMMARY

The present invention provides a roll angle estimation device which is capable of estimating the roll angle of a moving body with an improved accuracy, and a transport apparatus including the same.

(1) A roll angle estimation device according to a first invention is a roll angle estimation device for estimating a roll angle of a moving body, comprising: first and second angular velocity detectors which detect first and second angular velocities respectively around first and second axes along at least two mutually different directions; first, second, and third acceleration detectors which respectively detect first, second, and third accelerations along at least three mutually different directions; a velocity detector which detects information concerning moving velocity of the moving body in a direction of travel; and arithmetic circuitry (or an estimation section) which estimates a roll angle of the moving body, and estimates a pitch angle and a pitch angular velocity of the moving body and at least one offset error of the first and second angular velocity detectors and the first, second, and third acceleration detectors, wherein, in a current estimation operation, the arithmetic circuitry estimates the roll angle, pitch angle, and pitch angular velocity of the moving body and the at least one offset error, based on: detection values by the first and second angular velocity detectors; detection values by the first, second, and third acceleration detectors; a detection value by the velocity detector; estimated values of the roll angle, pitch angle, and pitch angular velocity from a previous estimation operation; and an estimated value of the offset error from the previous estimation operation.

In the above roll angle estimation device, first and second angular velocities around first and second axes along at least two mutually different directions are respectively detected by the first and second angular velocity detectors. Moreover, first, second, and third accelerations along at least three mutually different directions are respectively detected by the first, second, and third acceleration detectors. Furthermore, information concerning moving velocity of a moving body in a direction of travel is detected by the velocity detector. Then, the arithmetic circuitry estimates a roll angle of the moving body, and estimates a pitch angle and a pitch angular velocity of the moving body and at least one offset error of the first and second angular velocity detectors and the first, second, and third acceleration detectors.

In this case, in a current estimation operation, the arithmetic circuitry estimates the roll angle, pitch angle, and pitch angular velocity of the moving body and the at least one offset error, based on detection values by the first and second angular velocity detectors, detection values by the first, second, and third acceleration detectors, a detection value by the velocity detector, estimated values of the roll angle, pitch angle, and pitch angular velocity from a previous estimation operation, and on an estimated value of the offset error from the previous estimation operation.

Thus, a roll angle and also an offset error are estimated, and an estimated value of the offset error is used for a next estimation operation. This compensates for a decrease in the accuracy of estimation of the roll angle by utilizing the roll angle, pitch angle, and pitch angular velocity of the moving body, and at least one offset error of the first and second angular velocity detectors and the first, second, and third acceleration detectors. As a result, the roll angle can be estimated with high accuracy.

(2) The first and second angular velocity detectors may respectively detect a roll angular velocity and a yaw angular velocity; and the first, second, and third acceleration detectors respectively detect first, second, and third accelerations along three mutually different directions.

In this case, roll angular velocity and yaw angular velocity are respectively detected by the first and second angular velocity detectors. Moreover, first, second, and third accelerations along mutually different first, second, and third directions are respectively detected by the first, second, and third acceleration detectors.

(3) In the current estimation operation, the arithmetic circuitry may estimate a pitch angle based on the estimated value of the pitch angular velocity from the previous estimation operation, and estimate a pitch angular velocity based on the estimated value of the pitch angular velocity from the previous estimation operation.

(4) In the current estimation operation, the arithmetic circuitry may estimate a pitch angle based on a value obtained by integrating the estimated value of the pitch angular velocity from the previous estimation operation over a time interval between the current estimation operation and the previous estimation operation, and estimate a pitch angular velocity based on a value obtained by integrating the estimated value of the pitch angular velocity from the previous estimation operation.

(5) In the roll angle estimation device of any of (1) to (4) above, the arithmetic circuitry may comprise a Kalman filter which, in the current estimation operation, estimates the roll angle, pitch angle, and pitch angular velocity of the moving body and the at least one offset error based on a relationship among: detection values by the first and second angular velocity detectors; detection values by the first, second, and third acceleration detectors; a detection value by the velocity detector; estimated values of the roll angle, pitch angle, and pitch angular velocity from a previous estimation operation; and an estimated value of the offset error from the previous estimation operation.

In this case, the arithmetic circuitry can be easily implemented by using a Kalman filter algorithm.

(6) The aforementioned Kalman filter may comprise a saturation limiting circuit which, when any estimated value exceeds an upper limit value of a predetermined range, sets the estimated value with the upper limit value, and when any estimated value is lower than a lower limit value of the predetermined range, sets the estimated value with the lower limit value.

By limiting the learning (estimation) range of offset errors, it becomes possible to prevent deviation of learned values (estimated values) into a range of errors which actually will not occur, whereby the accuracy of estimation of the roll angle is further improved.

(7) The aforementioned saturation limiting circuit, when any estimated value exceeds an upper limit value of a predetermined range, sets the estimated value with the upper limit value, and when any estimated value is lower than a lower limit value of the predetermined range, sets the estimated value with the lower limit value at least with respect to estimated values of the roll angle, the pitch angle, and an offset error of pitch angular velocity.

By using estimated values of offset errors of the roll angle, pitch angle, and pitch angular velocity for the next estimation operation, the accuracy of estimation of the roll angle is more improved.

(8) The arithmetic circuitry may include low-pass filters that receive outputs from the first and second angular velocity detectors, the first, second, and third accelerations detector, and the velocity detector, and treat the outputs having been transmitted through the low-pass filters as, respectively, the detection values of the first and second angular velocity detectors, the first, second, and third accelerations detector, and the velocity detector.

(9) The moving body may include a front wheel and a rear wheel; the velocity detector may include a rear-wheel rotation speed detector which detects a rotation speed of the rear wheel as the information; and the arithmetic circuitry of the roll angle estimation device of any of (1) to (8) above may further estimate a moving velocity of the moving body, and, in the current estimation operation, estimate the roll angle of the moving body, the at least one offset error, and the moving velocity of moving body, based on: detection values by the first and second angular velocity detectors; detection values by the first, second, and third acceleration detectors; a detection value by the rear-wheel speed detector; an estimated value of the roll angle from a previous estimation operation; an estimated value of the offset error from the previous estimation operation; and an estimated value of the moving velocity from the previous estimation operation.

(10) The moving body may include a front wheel and a rear wheel; the velocity detector may include a front-wheel rotation speed detector which detects a rotation speed of the front wheel, and a rear-wheel rotation speed arithmetic circuitry (or rear-wheel rotation speed estimation section) which estimates a rotation speed of the rear wheel from a detection value by the front-wheel rotation speed detector as the information; and the arithmetic circuitry of the roll angle estimation device of any of (1) to (8) above may further estimate a moving velocity of the moving body, and, in the current estimation operation, estimate the roll angle of the moving body, the at least one offset error, and the moving velocity of moving body, based on: detection values by the first and second angular velocity detectors; detection values by the first, second, and third acceleration detectors; an estimated value by the rear-wheel rotation speed arithmetic circuitry; an estimated value of the roll angle from a previous estimation operation; an estimated value of the offset error from the previous estimation operation; and an estimated value of the moving velocity from the previous estimation operation.

(11) A transport apparatus according to a second invention is a transport apparatus comprising: a moving body which is capable of moving; the roll angle estimation device of any of (1) to (10) above which estimates a roll angle of the moving body; and a processing device which performs processing using the roll angle estimated by the roll angle estimation device.

In the above transport apparatus, the roll angle estimation device according to the first invention estimates the roll angle of the moving body with high accuracy. As a result, with high accuracy, the processing section is able to carry out processing which involves the roll angle.

Note that an angular velocity detector is more susceptible to offset errors than is an acceleration detector. Therefore, an estimated value of the offset error of at least one of the first and second angular velocity detectors may be used for the next estimation operation. As a result, the accuracy of estimation of the roll angle is sufficiently improved.

In a range where the roll angle of the moving body is small, acceleration of the moving body along the vertical direction hardly changes. When a detected value of such acceleration along the vertical direction is affected by the offset error of the first acceleration detector, changes in the detected value of the acceleration along the vertical direction will exert a large influence on the estimation of the roll angle. Therefore, the estimated value of the offset error of the first acceleration detector may be used in a next estimation operation, to thereby further improve the accuracy of estimation of the roll angle in a range the roll angle is small.

When the moving body turns in a small radius and with a low velocity, the rotation speed of the rear wheel is closer to the moving velocity of the moving body than is the rotation speed of the front wheel. Therefore, the roll angle of the moving body, at least one offset error, and the moving velocity of the moving body can be estimated with high accuracy by using a rotation speed of the detected value of the rear wheel.

When the moving body turns in a small radius and with a low velocity, the turning radius of the front wheel becomes larger than the turning radius of the rear wheel. This makes the rotation speed of the front wheel detected by the front-wheel rotation speed detector higher than the rotation speed of the rear wheel. Accordingly, the rear-wheel rotation speed arithmetic circuitry estimates the rotation speed of the rear wheel from a detection value by the front-wheel rotation speed detector. Thus, when a front-wheel rotation speed detector is provided, too, the roll angle of the moving body, at least one offset error, and the moving velocity of the moving body can be estimated with high accuracy, similarly to the case where a rear-wheel rotation speed detector is provided.

According to the present invention, the roll angle of a moving body can be estimated with high accuracy.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIGS. 7A, 7B, and 7C are diagrams respectively showing time transition of the estimated value of each parameter.

DETAILED DESCRIPTION

Hereinafter, examples of applying roll angle estimation devices according to embodiments of the present invention to a vehicle will be described.

(1) Vehicle Construction

Figure 1:
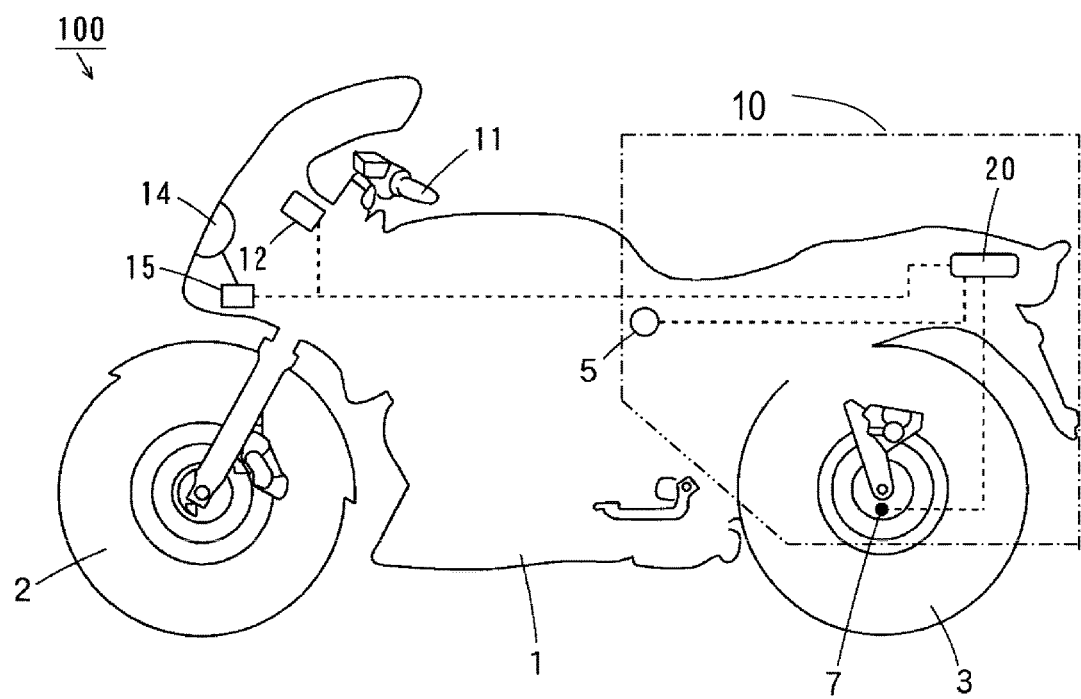
FIG. 1 is a schematic diagram of a vehicle including a roll angle estimation device according to an embodiment of the present invention.

FIG. 1 is a schematic diagram showing a vehicle including a roll angle estimation device according to an embodiment of the present invention. The vehicle 100 in FIG. 1 is a motorcycle.

As shown in FIG. 1, the vehicle 100 includes a vehicle body 1. A front wheel 2 is attached at the front of the vehicle body 1, and a rear wheel 3 is attached at the rear of the vehicle body 1. Moreover, a sensor group 5 is attached in the central portion of the vehicle body 1. Details of the sensor group 5 will be described later.

On the metal wheel of the rear wheel 3, a rear-wheel speed sensor 7 for detecting rotation speed of the rear wheel 3 is attached.

In an upper-front portion of the vehicle body 1, handle bars 11 are provided so as to be capable of swinging right or left. A navigation system 12 is provided near the handle bars 11. Moreover, a headlight 14 and a headlight driver 15 are provided at the front of the vehicle body 1. The headlight driver 15 controls orientation of the headlight 14. An electronic control unit (hereinafter abbreviated as the "ECU") 20 is provided at the rear of the vehicle body 1. ECU 20 is a hardware device such as arithmetic circuitry as a computer, which includes, for example, one or more microprocessors, and an analog and/or digital filter device(s). The arithmetic circuitry carries out computer program codes or instructions to produce a machine, special purpose computer, etc., such that the arithmetic circuitry functions as different components, a means or section(s) for implementing the functions/acts specified in the flowchart and/or block diagram block or blocks by executing the computer program codes or instructions.

Output signals from the sensor group 5 and the rear-wheel speed sensor 7 are supplied to the ECU 20. The ECU 20 controls the elements of the vehicle body 1 and estimates the roll angle of the vehicle body 1, and supplies the estimated roll angle to the navigation system 12 and the headlight driver 15, for example.

In the present embodiment, the sensor group 5, the rear-wheel speed sensor 7, and the ECU 20 constitute a roll angle estimation device 10.

(2) Construction of the Roll Angle Estimation Device

Figure 2:
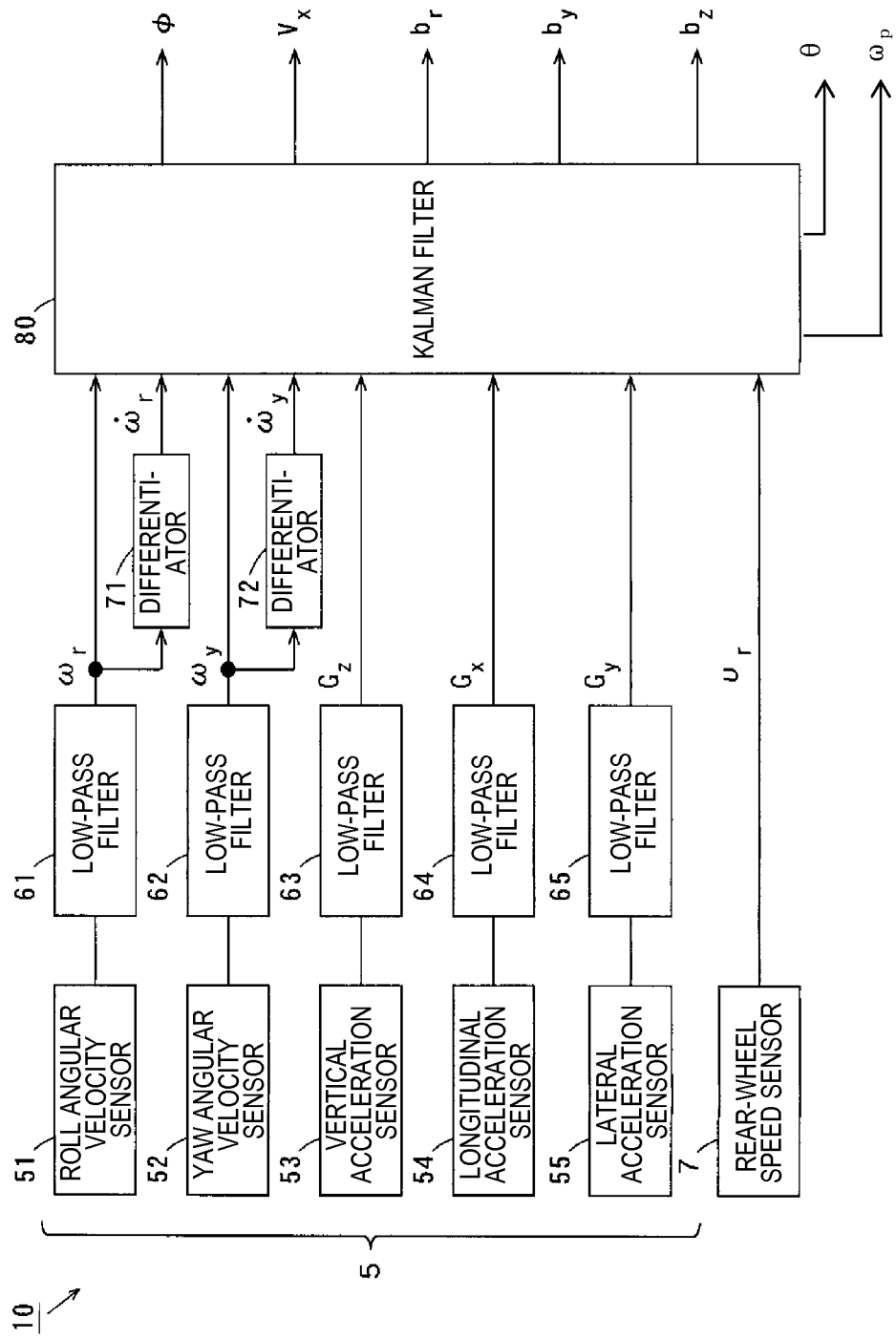
FIG. 2 is a block diagram showing the construction of a roll angle estimation device according to an embodiment of the present invention.

FIG. 2 is a block diagram showing the construction of the roll angle estimation device 10 according to an embodiment of the present invention.

The roll angle estimation device 10 in FIG. 2 is composed of the sensor group 5, the rear-wheel speed sensor 7, low-pass filters 61 to 65, differentiators 71 and 72, and a Kalman filter 80. The function of the filter 80 is realized by the ECU 20 in FIG. 1 and also a computer program.

The sensor group 5 includes: a roll angular velocity sensor 51, a yaw angular velocity sensor 52, an vertical acceleration sensor 53, a longitudinal acceleration sensor 54, and a lateral acceleration sensor 55.

The roll angular velocity sensor 51 is provided on the vehicle body 1 to detect roll angular velocity of the vehicle body 1. Roll angular velocity is an angular velocity around the longitudinal axis of the vehicle 100. The yaw angular velocity sensor 52 is provided on the vehicle body 1 to detect yaw angular velocity of the vehicle body 1. Yaw angular velocity is an angular velocity around the vertical axis of the vehicle 100.

The vertical acceleration sensor 53 is provided on the vehicle body 1 to detect vertical acceleration of the vehicle body 1. Vertical acceleration is an acceleration along the vertical (i.e., upper-lower) direction of the vehicle body 1. The longitudinal acceleration sensor 54 is provided on the vehicle body 1 to detect longitudinal acceleration of the vehicle body 1. Longitudinal acceleration is an acceleration along the longitudinal (i.e., front-rear) direction of the vehicle body 1. The lateral acceleration sensor 55 is provided on the vehicle body 1 to detect lateral acceleration of the vehicle body 1. Lateral acceleration is an acceleration along the lateral (i.e., right-left) direction of the vehicle body 1. Although the vertical acceleration sensor 53, the longitudinal acceleration sensor 54, and the lateral acceleration sensor 55 may seem to detect accelerations along mutually orthogonal directions, this is not essential. It suffices so long as these sensors are able to detect accelerations along three mutually different directions respectively.

Via the low-pass filter 61, the output signal from the roll angular velocity sensor 51 is supplied as roll angular velocity to the Kalman filter 80 and the differentiator 71. The low-pass filter 61 removes noise from the output signal from the roll angular velocity sensor 51. The differentiator 71 supplies a differential of the roll angular velocity as roll angular acceleration to the Kalman filter 80. Via the low-pass filter 62, the output signal from the yaw angular velocity sensor 52 is supplied as yaw angular velocity to the Kalman filter 80 and the differentiator 72. The low-pass filter 62 removes noise from the output signal from the yaw angular velocity sensor 52. The differentiator 72 supplies a differential of the yaw angular velocity as yaw angular acceleration to the Kalman filter 80.

Via the low-pass filter 63, the output signal from the vertical acceleration sensor 53 is supplied as vertical acceleration to the Kalman filter 80. Via the low-pass filter 64, the output signal from the longitudinal acceleration sensor 54 is supplied as longitudinal acceleration to the Kalman filter 80. Via the low-pass filter 65, the output signal from the lateral acceleration sensor 55 is supplied as lateral acceleration to the Kalman filter 80.

The respective frequency characteristics of the low-pass filters 61 to 65 are to be set according to the output characteristics of the corresponding sensors 51 to 55. More specifically, the frequency characteristics of the noise signals contained in the output signals from the sensors 51 to 55 can be previously specified at the design phase. The low-pass filters 61 to 65 may be designed so as to cut off such noise signals while passing necessary detection signals from the sensors 51 to 55.

The output signal from the rear-wheel speed sensor 7 is supplied as rear-wheel speed to the Kalman filter 80. Rear-wheel speed is the rotation speed of the outermost periphery of the tire under the assumption that no skid occurs between the road surface and the tire of the rear wheel 3, which in actuality is calculated based on the output signal from the rear-wheel speed sensor 7 and the tire size. To simplify the explanation, it is assumed in FIG. 2 that a signal indicating the rear-wheel speed is output from the rear-wheel speed sensor 7.

Roll angular velocity, roll angular acceleration, yaw angular velocity, yaw angular acceleration, vertical acceleration, longitudinal acceleration, lateral acceleration, and rear-wheel speed will be represented by symbols in the following table. Note that the single dot above the symbol representing any parameter means first-order differentiation.

TABLE 1

| parameter | definition |
| --- | --- |
| $\omega_r$ | roll angular velocity |
| $\dot{\omega}_r$ | roll angular acceleration |
| $\omega_y$ | yaw angular velocity |
| $\dot{\omega}_y$ | yaw angular acceleration |
| $G_z$ | vertical acceleration |
| $G_x$ | longitudinal acceleration |
| $G_y$ | lateral acceleration |
| $v_r$ | rear-wheel speed |

Based on the above parameters, the Kalman filter 80 estimates and outputs a roll angle, a vehicle speed, a roll angular velocity sensor offset, a yaw angular velocity sensor offset, an vertical acceleration sensor offset, a pitch angle, and a pitch angular velocity.

Herein, the vertical plane which is parallel to the direction of travel of the vehicle 100 will be referred to as the longitudinal vertical plane, whereas the vertical plane which is perpendicular to the longitudinal vertical plane will be referred to as the lateral vertical plane. The roll angle is an angle of inclination of the vehicle body 1 with respect to the direction of gravity in the lateral vertical plane. Vehicle speed is the velocity of the vehicle body 1 along the direction of travel.

The roll angular velocity sensor offset is an offset error of the roll angular velocity sensor 51; the yaw angular velocity sensor offset is an offset error of the yaw angular velocity sensor 52; and the vertical acceleration sensor offset is an offset error of the vertical acceleration sensor 53.

Vehicle speed, roll angular velocity sensor offset, yaw angular velocity sensor offset, vertical acceleration sensor offset, pitch angle, and pitch angular velocity will be represented by symbols in the following table.

TABLE 2

| parameter | definition |
| --- | --- |
| $\varphi$ | roll angle |
| $V_x$ | vehicle speed |
| $b_r$ | roll angular velocity sensor offset |
| $b_y$ | yaw angular velocity sensor offset |
| $b_z$ | vertical acceleration sensor offset |
| $\theta$ | pitch angle |
| $\omega_p$ | pitch angular velocity |

In the roll angle estimation device 10 of the present embodiment, the roll angular velocity sensor 51, the yaw angular velocity sensor 52, the vertical acceleration sensor 53, the longitudinal acceleration sensor 54, the lateral acceleration sensor 55, and the rear-wheel speed sensor 7 are used to derive seven relational expressions in eqs. (16), (17), and (19) shown later. By using these relational expressions, the four parameters of roll angle $\varphi$, vehicle speed $V_x$, pitch angle $\theta$, and pitch angular velocity $\omega_p$ are estimated. In other words, there is redundancy between the number of relational expressions and the number of estimated outputs; that is, there are more relational expressions than estimated outputs. This redundancy enables estimation of the roll angular velocity sensor offset $b_r$, yaw angular velocity sensor offset $b_y$, and vertical acceleration sensor offset $b_z$.

(3) Construction of the Kalman Filter 80

Figure 3:
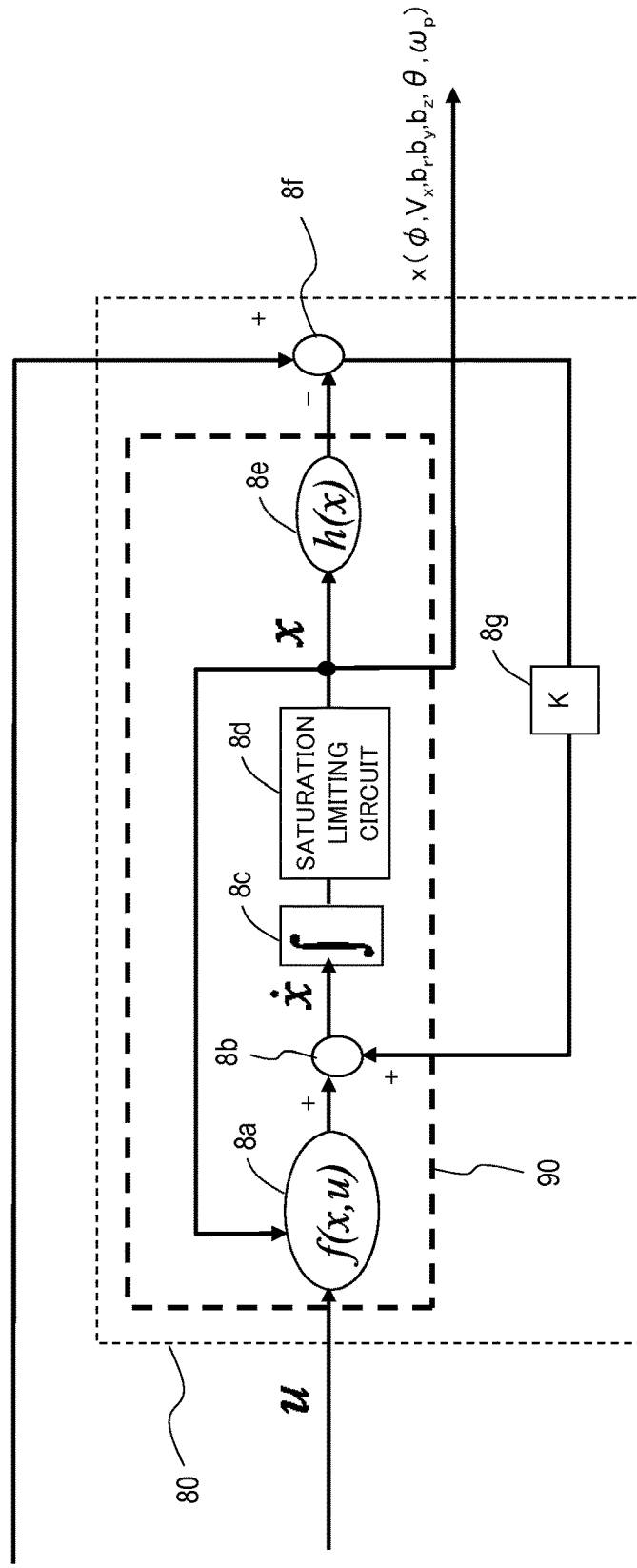
FIG. 3 is a diagram showing the concept of a Kalman filter.

FIG. 3 is a diagram showing the concept of the Kalman filter 80. In the Kalman filter 80 of FIG. 3, a kinematic model 90 for the vehicle 100 as described below is used.

In FIG. 3, the Kalman filter 80 includes a system equation 8a, an adder 8b, an integrator 8c, a saturation limiting circuit 8d, an observation equation 8e, a subtracter 8f, and a Kalman gain 8g. The system equation 8a includes the mathematical function f(x,u); the observation equation 8e includes the mathematical function h(x); and the Kalman gain 8g includes septic Kalman gains K.

Note that, as mentioned earlier, the Kalman filter 80 is realized by the ECU 20 in FIG. 1 and also a computer program. More specifically, arithmetic operations of substituting respective input values to the system equation 8a and the observation equation 8e, as well as the addition calculation by the adder 8b, the integration calculation by the integrator 8c, the subsequently-described saturation limiting process by the saturation limiting circuit 8d, the subtraction calculation by the subtracter 8f, and the multiplication calculation by the Kalman gain 8g are realized as the ECU 20 in FIG. 1 executes a computer program which is provided in advance. However, some or all of the system equation 8a, adder 8b, integrator 8c, saturation limiting circuit 8d, observation equation 8e, subtracter 8f, and Kalman gain 8g may be implemented as an independent piece(s) of hardware. For example, as the saturation limiting circuit 8d, a circuit (state-estimation-amount saturation limiting circuit) having that specific function may be mounted.

In a current estimation operation, as input parameters u of the system equation 8a, a detected value of roll angular velocity $\omega_r$, a detected value of roll angular acceleration (differential of roll angular velocity $\omega_r$), a detected value of yaw angular velocity $\omega_y$, yaw angular acceleration (differential of yaw angular velocity $\omega_y$), and a detected value of longitudinal acceleration $G_x$ are supplied. Moreover, as input parameters x for the system equation 8a, an estimated value of the roll angle $\varphi$, an estimated value of vehicle speed $V_x$, an estimated value of roll angular velocity sensor offset $b_r$, an estimated value of yaw angular velocity sensor offset $b_y$, an estimated value of vertical acceleration sensor offset $b_z$, an estimated value of pitch angle $\theta$, and an estimated value of pitch angular velocity $\omega_p$ from the previous estimation operation are supplied. The outputs of the system equation 8a are a predicted differential of the roll angle $\varphi$, a predicted differential of vehicle speed $V_x$, a predicted differential of roll angular velocity sensor offset $b_r$, a predicted differential of yaw angular velocity sensor offset $b_y$, a predicted differential of vertical acceleration sensor offset $b_z$, a predicted differential of the pitch angle $\theta$, and a predicted differential of pitch angular velocity $\omega_p$.

Products of an output of the subtracter 8f and the septic Kalman gains K obtained from the previous estimation operation are added to the predicted differential of the roll angle $\varphi$, predicted differential of vehicle speed $V_x$, predicted differential of roll angular velocity sensor offset $b_r$, predicted differential of yaw angular velocity sensor offset $b_y$, predicted differential of vertical acceleration sensor offset $b_z$, predicted differential of the pitch angle $\theta$, and predicted differential of pitch angular velocity $\omega_p$. As a result, an estimated differential of the roll angle $\varphi$, an estimated differential of vehicle speed Vx, an estimated differential of roll angular velocity sensor offset $b_r$, an estimated differential of yaw angular velocity sensor offset $b_y$, as well as an estimated differential of vertical acceleration sensor offset $b_z$, an estimated differential of the pitch angle $\theta$, and an estimated differential of pitch angular velocity $\omega_p$ are obtained.

The integrator 8c integrates the estimated differential of the roll angle $\varphi$, estimated differential of vehicle speed $V_x$, estimated differential of roll angular velocity sensor offset $b_r$, estimated differential of yaw angular velocity sensor offset $b_y$, estimated differential of vertical acceleration sensor offset $b_z$, estimated differential of the pitch angle $\theta$, and estimated differential of pitch angular velocity $\omega_p$ in which the Kalman gain K is taken into account, thereby obtaining the following values in the current estimation operation: an estimated value of the roll angle $\varphi$, an estimated value of vehicle speed $V_x$, an estimated value of roll angular velocity sensor offset $b_r$, an estimated value of yaw angular velocity sensor offset $b_y$, an estimated value of vertical acceleration sensor offset $b_z$, an estimated value of the pitch angle $\theta$, and an estimated value of pitch angular velocity $\omega_p$.

The saturation limiting circuit 8d sets saturation characteristics for all of the estimated value of roll angular velocity sensor offset br, estimated value of yaw angular velocity sensor offset by, and estimated value of vertical acceleration sensor offset bz, for example. For example, if the estimated value of roll angular velocity sensor offset br is greater than the upper limit value, the saturation limiting circuit 8d corrects the value with an upper limit value, and if it is smaller than the lower limit value, the saturation limiting circuit 8d corrects the value with a lower limit value. The same also applies to the estimated value of yaw angular velocity sensor offset by and the estimated value of vertical acceleration sensor offset bz.

As will be understood from the above explanation, it may be said that the saturation limiting circuit 8d limits saturation of estimated values. This means limiting the learning (estimation) range of sensor offset errors. Such limitation prevents deviation of learned values into a range of errors which actually will not occur.

Note that the aforementioned three estimated values may not be all that the saturation limiting circuit 8d sets saturation characteristics for. Saturation characteristics may be set for the seven estimated values which are to be integrated by the integrator 8c. This will prevent substantial deviation in the learned values with respect to all estimated values.

As input parameters x for the observation equation 8e, an estimated value of the roll angle $\varphi$, an estimated value of vehicle speed $V_x$, an estimated value of roll angular velocity sensor offset $b_r$, an estimated value of yaw angular velocity sensor offset $b_y$, an estimated value of vertical acceleration sensor offset $b_z$, an estimated value of the pitch angle $\theta$, and an estimated value of pitch angular velocity $\omega_p$ are supplied. From the observation equation 8e, a calculated value of vertical acceleration $G_z$, a calculated value of lateral acceleration $G_y$, and a calculated value of rear-wheel speed $v_r$ are obtained.

By deriving the system equation 8a and the observation equation 8e under the kinematic model 90, relational expressions between input parameters u and y and output parameters x can be derived.

(4) Derivation of System Equation and Observation Equation

In the present embodiment, the following assumptions are made in order to simplify the kinematic model 90:

(a) there is no skid in the rotation direction between the rear wheel 3 and the road surface; and (b) the lateral skid velocity of the rear wheel 3 is 0.

Based on these assumptions (a) and (b), equations of the kinematic model 90 are derived as follows.

Roll angle, differential of roll angle, pitch angle, differential of pitch angle, yaw angle, differential of yaw angle, roll angular velocity, yaw angular velocity, and pitch angular velocity will be represented by symbols in the following table.

TABLE 3

| parameter | definition |
|---|---|
| $\Phi$ | roll angle |
| $\dot{\Phi}$ | differential of roll angle |
| $\theta$ | pitch angle |
| $\dot{\theta}$ | differential of pitch angle |
| $\psi$ | yaw angle |
| $\dot{\psi}$ | differential of yaw angle |
| $\omega_r$ | roll angular velocity |
| $\omega_y$ | yaw angular velocity |
| $\omega_p$ | pitch angular velocity |

First, from a general relational expression between Euler angles and angular velocity, the following equation holds true.

[eq. 1]
$$\begin{bmatrix} \dot{\phi} \\ \dot{\theta} \\ \dot{\psi} \end{bmatrix} = \begin{bmatrix} 1 & \tan\theta\sin\phi & \tan\theta\cos\phi \\ 0 & \cos\phi & -\sin\phi \\ 0 & \sin\phi\sec\theta & \cos\phi\sec\theta \end{bmatrix} \begin{bmatrix} \omega_r \\ \omega_p \\ \omega_y \end{bmatrix} \quad (1)$$

From eq. (1), a roll angle differential is derived as in the following equation.

[eq. 2]
$$\dot{\phi} = \omega_r + \dot{\theta}\tan\phi\tan\theta + \omega_y\sec\phi\tan\theta \quad (2)$$

Figure 4:
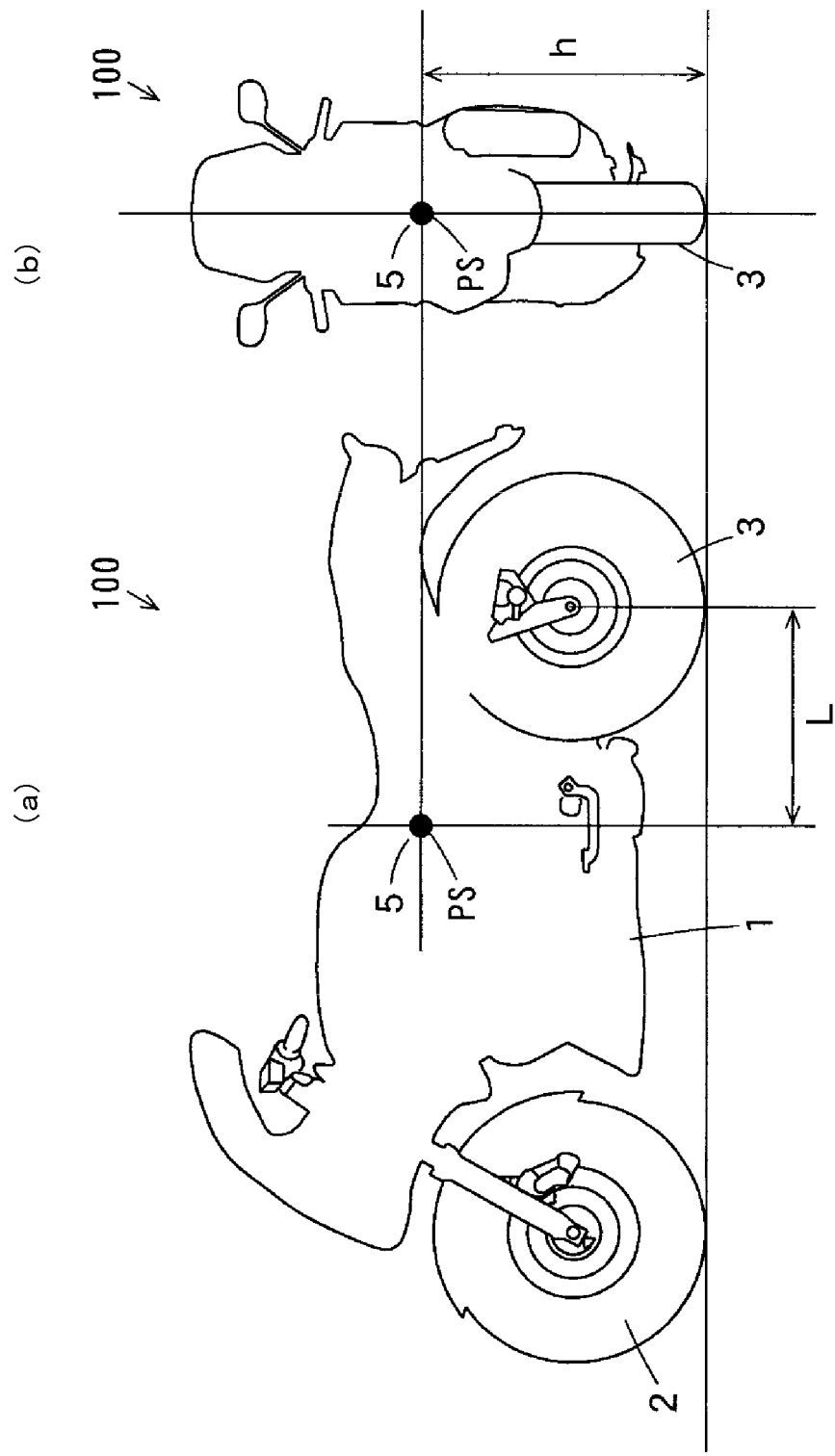
FIG. 4, including (a) and (b), is a diagram describing a position at which a sensor group of the vehicle 100 is attached.
Figure 5:
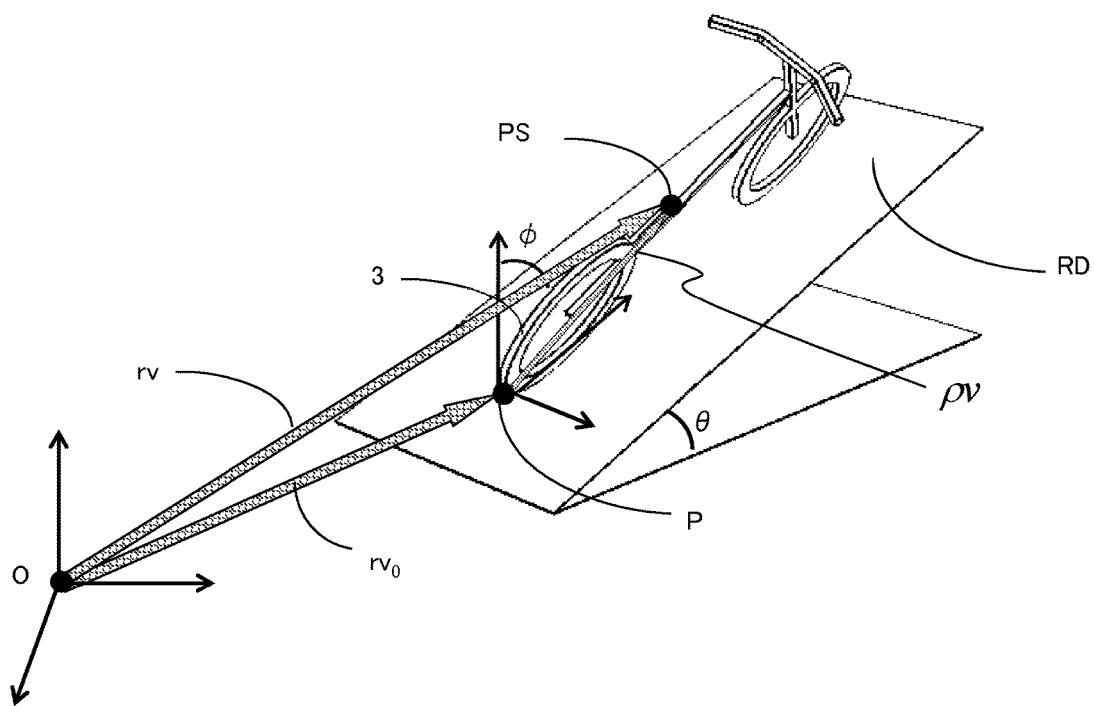
FIG. 5 is a vectorial representation of the attachment position of the sensor group.

FIG. 4 is a diagram describing a position at which the sensor group 5 is attached. In FIG. 4, (a) shows the left side of the vehicle 100, and (b) shows the front of the vehicle 100. FIG. 5 is a vectorial representation of the attachment position of the sensor group 5.

In (a) and (b) of FIG. 4, the attachment position of the sensor group 5 is denoted as PS. There is a horizontal distance L from the attachment position PS to the center of the rear wheel 3, and a height h from the road surface to the attachment position PS.

In FIG. 5, the rear wheel 3 is inclined by the roll angle φ from the road surface RD, which is inclined from the inertia coordinate system origin O by the pitch angle θ. FIG. 5 defines a position vector rv of the attachment position PS of the sensor group 5 relative to the origin O of the inertia coordinate system, a position vector $rv_0$ of a tangential point P relative to the origin O of the inertia coordinate system, and a vector ρv from the tangential point P to the attachment position PS of the sensor group 5. In this case, $rv = rv_0 + \rho v$ holds true.

A second-order differentiation vector of position vector rv, a second-order differentiation vector of position vector $rv_0$, a second-order differentiation vector of vector ρ v, and an gravitational acceleration vector will be represented by symbols in the following table. Note that the double dots above the symbol representing any parameter mean second-order differentiation.

TABLE 4

| parameter | definition |
|---|---|
| $\ddot{rv}$ | second-order differentiation vector of position vector rv |
| $\ddot{rv}_0$ | second-order differentiation vector of position vector $rv_0$ |
| $\ddot{\rho v}$ | second-order differentiation vector of attachment position vector ρv |
| gv | gravitational acceleration vector |

Assume that an acceleration vector Gv of the attachment position PS is detected by the vertical acceleration sensor 53, longitudinal acceleration sensor 54, and lateral acceleration sensor 55. The acceleration vector Gv is obtained by adding the gravitational acceleration vector gv to the second-order differentiation vector of the position vector rv, as indicated by the following equation.

[eq. 3]
$$Gv = \ddot{rv} + gv = \ddot{rv}_0 + \ddot{\rho v} + gv \quad (3)$$

The right-hand side of eq. (3) above will now be calculated. The vector ρv in FIG. 5 is expressed by the following equation.

[eq. 4]
$$\rho v = [e_3]\rho \quad (4)$$

In eq. (4) above, $[e_3] = [e_{31}, e_{32}, e_{33}]$, where $e_{31}$, $e_{32}$, and $e_{33}$ are base vectors which are fixed on the vehicle body 1. The vector $e_{31}$ is a base vector of the vehicle body 1 along the forward direction; the vector $e_{32}$ is a base vector of the vehicle body 1 along the left direction; and the vector $e_{33}$ is a base vector of the vehicle body 1 along the vertically upward direction. ρ is a matrix. From FIG. 4, the matrix ρ in eq. (4) above is expressed by the following equation.

[eq. 5]
$$\rho = \begin{bmatrix} L \\ 0 \\ h \end{bmatrix} \quad (5)$$

From eq. (5) above, a second-order differentiation vector of the vector ρv is obtained as in the following equation.

[eq. 6]
$$\ddot{\rho v} = [e] \begin{bmatrix} a_x(\omega_r, \omega_y, \dot{\omega}_r, \dot{\omega}_y, \phi, \theta, \dot{\theta}, L, h) \\ a_y(\omega_r, \omega_y, \dot{\omega}_r, \dot{\omega}_y, \phi, \theta, \dot{\theta}, L, h) \\ a_z(\omega_r, \omega_y, \dot{\omega}_r, \dot{\omega}_y, \phi, \theta, \dot{\theta}, L, h) \end{bmatrix} \quad (6)$$

In eq. (6) above, $a_x$, $a_y$, and $a_z$ are mathematical functions. The mathematical functions $a_x$, $a_y$, and $a_z$ can be determined from calculation of eqs. (4) and (5). By eliminating a differential of the roll angle φ and a differential of the yaw angle ψ from eq. (5) above, eq. (6) above is obtained.

Next, the lateral skid velocity of the vehicle 100 is denoted $V_y$. A first-order differentiation vector of the position vector $rv_0$ in FIG. 5 is expressed by the following equation, using the vehicle speed $V_x$ and the lateral skid velocity $V_y$.

[eq. 7]
$$\dot{rv}_0 = [e_2] \begin{bmatrix} V_x \\ V_y \\ 0 \end{bmatrix} \quad (7)$$

In eq. (7) above, $[e2] = [e2_1, e2_2, e2_3]$, where elements $e2_1$, $e2_2$, and $e2_3$ are base vectors which are obtained by rotating the base vector $[e0] = [e_1, e_2, e_3]$ of the inertia coordinate system by ψ along the yaw direction and by θ along the pitch direction.

From assumption (b), Vy=0. When eq. (7) above is subjected to first-order differentiation, a second-order differentiation vector of the position vector $rv_0$ is expressed by the following equation.

[eq. 8]
$$\ddot{rv}_0 = [e_3] \begin{bmatrix} 1 & & \\ & \cos\phi & \sin\phi \\ & -\sin\phi & \cos\phi \end{bmatrix} \begin{bmatrix} \dot{V}_x \\ \cos\theta(w_p\sin\phi\sec\theta + w_y\cos\phi\sec\theta)V_x \\ (-w_p\cos\phi + w_y\sin\phi)V_x \end{bmatrix} \quad (8)$$

Lastly, the gravitational acceleration vector is expressed by the following equation.

[eq. 9]
$$gv = [e_3] \begin{bmatrix} 1 & & \\ & \cos\phi & \sin\phi \\ & -\sin\phi & \cos\phi \end{bmatrix} \begin{bmatrix} \cos\theta & & -\sin\theta \\ & 1 & \\ \sin\theta & & \cos\theta \end{bmatrix} \begin{bmatrix} \cos\psi & \sin\psi & \\ -\sin\psi & \cos\psi & \\ & & 1 \end{bmatrix} \begin{bmatrix} 0 \\ 0 \\ g \end{bmatrix} \quad (9)$$

In eq. (9) above, g represents the magnitude of gravitational acceleration.

From eqs. (3), (6), (8), and (9) above, the acceleration vector Gv detected at the attachment position PS is expressed by the following equation.

[eq. 10]
$$Gv = \ddot{r}v + gv = \quad (10)$$
$$\ddot{r}v_0 + \dot{p}v + gv = [e_3] \begin{bmatrix} a_x(\omega_r, \omega_y, \dot{\omega}_r, \dot{\omega}_y, \phi, \theta, \dot{\theta}, L, h, \dot{V}_x, g) \\ a_y(\omega_r, \omega_y, \dot{\omega}_r, \dot{\omega}_y, \phi, \theta, \dot{\theta}, L, h, V_x, g) \\ a_z(\omega_r, \omega_y, \dot{\omega}_r, \dot{\omega}_y, \phi, \theta, \dot{\theta}, L, h, V_x, g) \end{bmatrix}$$

Now, the acceleration vector Gv detected at the attachment position PS is expressed by the following equation, using the longitudinal acceleration $G_x$ detected by the longitudinal acceleration sensor 54, the lateral acceleration $G_y$ detected by the lateral acceleration sensor 55, and the vertical acceleration $G_z$ detected by the vertical acceleration sensor 53.

$$Gv = [e][G_x, G_y, G_z]$$

Therefore, from eq. (10) above, the longitudinal acceleration $G_x$ detected by the longitudinal acceleration sensor 54, the lateral acceleration $G_y$ detected by the lateral acceleration sensor 55, and the vertical acceleration $G_z$ detected by the vertical acceleration sensor 53 are expressed by the following equation.

[eq. 11]
$$\begin{bmatrix} G_x \\ G_y \\ G_z \end{bmatrix} = \begin{bmatrix} a_x(\omega_r, \omega_y, \dot{\omega}_r, \dot{\omega}_y, \phi, \theta, \dot{\theta}, L, h, \dot{V}_x, g) \\ a_y(\omega_r, \omega_y, \dot{\omega}_r, \dot{\omega}_y, \phi, \theta, \dot{\theta}, L, h, V_x, g) \\ a_z(\omega_r, \omega_y, \dot{\omega}_r, \dot{\omega}_y, \phi, \theta, \dot{\theta}, L, h, V_x, g) \end{bmatrix} \quad (11)$$

Next, the relationship between the rear-wheel speed $v_r$ and the vehicle speed $V_x$ is determined. From assumption (a) above, there is no skid occurring between the rear wheel 3 and the road surface, and thus the relationship expressed by the following equation holds true between the rear-wheel speed $v_r$ and the vehicle speed $V_x$.

[eq. 12]
$$\frac{V_x}{R_e - R_{cr}(1 - \cos\phi)} = \frac{v_r}{R_e} \quad (12)$$

Eq. (12) above gives the following equation.

[eq. 13]
$$v_r = \frac{R_e}{R_e - R_{cr}(1 - \cos\phi)} V_x = \frac{1}{1 - R_{cr}/R_e(1 - \cos\phi)} V_x \quad (13)$$

Eqs. (2), (11), and (13) above give the following equation.

[eq. 14]
$$\frac{d}{dr}\begin{bmatrix} \phi \\ V_x \end{bmatrix} = \begin{bmatrix} \dot{\phi}(\omega_r, \omega_y, \phi, \theta, \dot{\theta}) \\ G_x - a_x(\omega_r, \omega_y, \dot{\omega}_r, \dot{\omega}_y, \phi, \theta, \dot{\theta}, L, h, g) \end{bmatrix} \quad (14)$$

[eq. 15]
$$\begin{bmatrix} G_y \\ G_z \\ v_r \end{bmatrix} = \begin{bmatrix} a_y(\omega_r, \omega_y, \dot{\omega}_r, \dot{\omega}_y, \phi, \theta, \dot{\theta}, L, h, V_x, g) \\ a_z(\omega_r, \omega_y, \dot{\omega}_r, \dot{\omega}_y, \phi, \theta, \dot{\theta}, L, h, V_x, g) \\ \dfrac{1}{1 - R_{cr}/R_e(1 - \cos\phi)} V \end{bmatrix} \quad (15)$$

The use of eq. (14) above as the system equation, and eq. (15) above as the observation equation enables application of an extended Kalman filter.

Furthermore, even when changes occur in the roll angular velocity sensor offset $b_r$, the yaw angular velocity sensor offset $b_y$, and the vertical acceleration sensor offset $b_z$, the changes in these values are slower than the motion of the vehicle 100. Therefore, the differential of the roll angular velocity sensor offset $b_r$, the differential of the yaw angular velocity sensor offset $b_y$, and the differential of the vertical acceleration sensor offset $b_z$ can be regarded as zero.

Moreover, by replacing the roll angular velocity $\omega_r$, yaw angular velocity $\omega_y$, and vertical acceleration $G_z$ in eqs. (14) and (15) above with $\omega_r - b_r$, $\omega_y - b_y$, and $G_z - b_z$, respectively, the following equation is derived.

[eq. 16]
$$\frac{d}{dt}\begin{bmatrix} \phi \\ V_x \\ b_r \\ b_y \\ b_z \end{bmatrix} = \begin{bmatrix} \dot{\phi}(\omega_r - b_r, \omega_y - b_y, \phi, \theta, \dot{\theta}) \\ G_x - a_x(\omega_r - b_r, \omega_y - b_y, \dot{\omega}_r, \dot{\omega}_y, \phi, \theta, \dot{\theta}, L, h, g) \\ 0 \\ 0 \\ 0 \end{bmatrix} \quad (16)$$

[eq. 17]
$$\begin{bmatrix} G_y \\ G_z \\ v_r \end{bmatrix} = \begin{bmatrix} a_y(\omega_r - b_r, \omega_y - b_y, \dot{\omega}_r, \dot{\omega}_y, \phi, \theta, \dot{\theta}, L, h, V_x, g) \\ a_z(\omega_r - b_r, \omega_y - b_y, \dot{\omega}_r, \dot{\omega}_y, \phi, \theta, \dot{\theta}, L, h, V_x, g) \\ \dfrac{1}{1 - R_{cr}/R_e(1 - \cos\phi)} V \end{bmatrix} \quad (17)$$

Eqs. (16) and (17) above take into account the roll angular velocity sensor offset $b_r$, yaw angular velocity sensor offset $b_y$, and vertical acceleration sensor offset $b_z$.

Moreover, when the pitch angular velocity $\omega_p$ varies in accordance with a coefficient $\tau$, the pitch angle $\theta$ and pitch angular velocity $\omega_p$ can be expressed by eq. (18). The coefficient $\tau$ is adjusted by the amount of change in pitch angular velocity occurring in the vehicle body 100.

[eq. 18]

$$\frac{d}{dt}\begin{bmatrix} \theta \\ \omega_p \end{bmatrix} = \begin{bmatrix} \omega_p \\ -\alpha\omega_p \end{bmatrix} \quad (18)$$

Note that parameter α represents an exponential decay factor. Parameter $\omega_p$ is a mathematical function of time t. The aforementioned coefficient τ is included in the exponential decay factor as a time constant. In other words, α=1/τ. Furthermore, from eq. (16) and eq. (18), eq. (19) below is derived.

[eq. 19]

$$\frac{d}{dt}\begin{bmatrix} \phi \\ V_x \\ b_r \\ b_y \\ b_z \\ \theta \\ \omega_p \end{bmatrix} = \begin{bmatrix} \dot{\phi}(\omega_r - b_r, \omega_y - b_y, \phi, \theta, \dot{\theta}) \\ G_x - a_x(\omega_r - b_r, \omega_y - b_y, \dot{\omega}_r, \dot{\omega}_y, \phi, \theta, \dot{\theta}, L, h, g) \\ 0 \\ 0 \\ 0 \\ \omega_p \\ -1/\tau\omega_p \end{bmatrix} \quad (19)$$

By applying an extended Kalman filter with eq. (17) above as the observation equation and eq. (19) above as the system equation, the roll angle φ, vehicle speed Vx, roll angular velocity sensor offset $b_r$, yaw angular velocity sensor offset $b_y$, vertical acceleration sensor offset $b_z$, pitch angle θ, and pitch angular velocity $\omega_p$ can be estimated.

Herein, the right-hand side of eq. (19) above corresponds to the mathematical function f(x,u) in FIG. 3, whereas the right-hand side of eq. (17) above corresponds to the mathematical function h(x) in FIG. 3.

An angular velocity sensor is more susceptible to offset errors than is an acceleration sensor. Therefore, in the present embodiment, an offset error of the roll angular velocity sensor 51 (roll angular velocity sensor offset $b_r$) and an offset error of the yaw angular velocity sensor 52 (yaw angular velocity sensor offset $b_y$) are estimated. By using the roll angular velocity sensor offset $b_r$ and estimated value of yaw angular velocity sensor offset $b_y$ in a next estimation operation, the accuracy of estimation of the roll angle φ is sufficiently improved.

Moreover, if offset errors of three acceleration sensors (vertical acceleration sensor 53, longitudinal acceleration sensor 54, and lateral acceleration sensor 55) can be estimated, the accuracy of estimation of the roll angle φ is expected to be further improved. However, observability cannot be maintained when offset errors of three acceleration sensors are to be estimated. Therefore, the present embodiment estimates an offset error of the vertical acceleration sensor 53 (vertical acceleration sensor offset $b_z$), for the following reasons. In a range where the roll angle φ of the vehicle body 1 is small, the vertical acceleration of the vehicle body 1 hardly changes. When a detected value of such vertical acceleration is affected by the vertical acceleration sensor offset $b_z$, changes in the detected value of vertical acceleration will exert a large influence on the estimation of the roll angle φ. Therefore, the estimated value of vertical acceleration sensor offset $b_z$ is used in a next estimation operation, to thereby further improve the accuracy of estimation of the roll angle φ in a range where the roll angle φ is small.

(5) Calculation of Estimated Values of Parameters

Figure 6A:
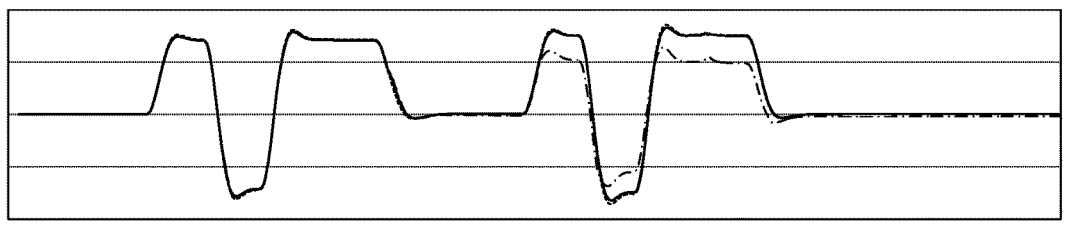
FIGS. 6A and 6B, are diagrams respectively showing time transition of estimated values of the roll angle φ and the pitch angle θ, as estimated by the roll angle estimation device.

FIG. 6A shows results of comparison between the estimated value of the roll angle φ and the true roll angle value depending on whether estimation of the pitch angle θ is performed or not. In FIG. 6A, a solid line indicates results in the case where estimation of the pitch angle θ and the pitch angular velocity is performed; a dot-dash line indicates results in the case where estimation of the pitch angular velocity and the pitch angle is not performed; and a broken line indicates true values. The fact that the broken line is mostly hidden under the solid line indicates that the estimation results of the pitch angle θ and the pitch angular velocity well approximate their true values.

Figure 6B:
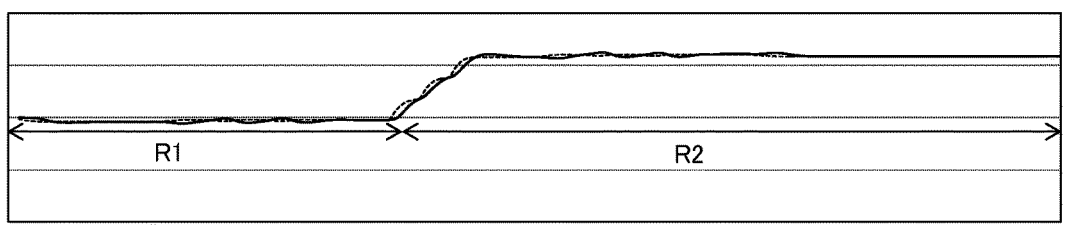

FIG. 6B shows a result of comparison between estimated values of the pitch angle θ and true pitch angle values. In FIG. 6B, a solid line indicates estimated values, and a broken line indicates true values. In FIG. 6B, a period R1 indicates a period of traveling flat terrain, and a period R2 indicates a period of traveling sloped terrain.

Figure 7A:
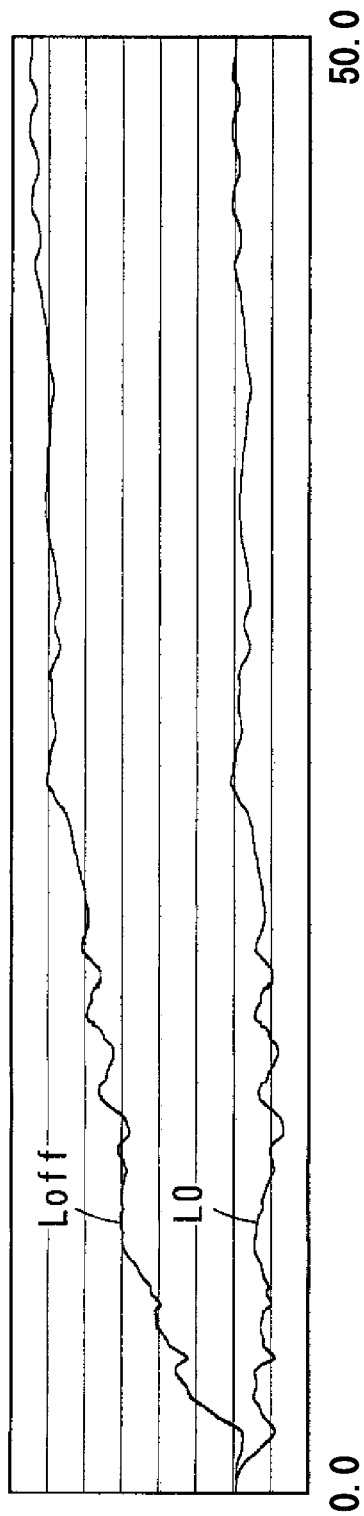
Figure 7B:
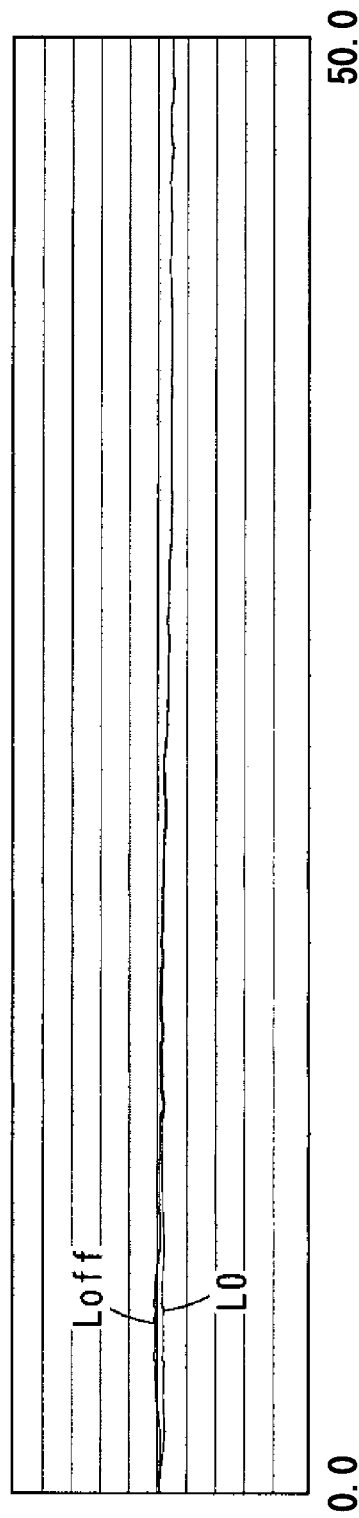

FIGS. 7A, 7B, and 7C are diagrams respectively showing time transition of the estimated value of each parameter in the case where the roll angular velocity sensor 51 has an offset error and in the case where the roll angular velocity sensor 51 does not have any offset error.

Herein, the roll angular velocity sensor 51, the yaw angular velocity sensor 52, the vertical acceleration sensor 53, the longitudinal acceleration sensor 54, the lateral acceleration sensor 55, and the rear-wheel speed sensor 7, each having no offset error, were attached to the vehicle 100, and estimated values of the respective parameters were calculated based on detection values of the roll angular velocity sensor 51, the yaw angular velocity sensor 52, the vertical acceleration sensor 53, the longitudinal acceleration sensor 54, the lateral acceleration sensor 55, and the rear-wheel speed sensor 7 during actual travel. Moreover, an offset error of 3 degs/s was added to the detection value of the roll angular velocity sensor 51. Thus, estimated values of the respective parameters were calculated.

As mentioned earlier, FIGS. 6A and 6B shows estimated values of the roll angle φ and the pitch angle θ. FIG. 7A shows the roll angular velocity sensor offset $b_r$; FIG. 7B shows the yaw angular velocity sensor offset $b_y$; and FIG. 7C shows the estimated value of vertical acceleration sensor offset $b_z$.

In a comparison from FIG. 6A between the results in the case where estimation of the pitch angle θ and the pitch angular velocity is performed (solid line) and the results in the case where estimation of the pitch angle and the pitch angular velocity is not performed (dot-dash line), it will be understood that the former better matches the true roll angle. It can be seen from FIG. 6B that the estimated pitch angle θ is very close to the true pitch angle; that is, the pitch angle θ is accurately estimated. On sloped terrain, in particular, the estimated value of the roll angle φ during travel in FIG. 6A is estimated closer to the true value. The fact that the three lines overlap on flat terrain indicates a high accuracy being maintained regardless of whether estimation of the roll angle φ is performed or not.

In FIGS. 7A, 7B, and 7C, the symbol L0 represents the estimated value of each parameter in the case where no offset is added to the roll angular velocity sensor 51, and Loff represents the estimated value of each parameter in the case where an offset error is added to the detection value of the roll angular velocity sensor 51.

As indicated in FIGS. 7A, 7B, and 7C, the difference between the estimated value of roll angular velocity sensor offset $b_r$ in the case where an offset error is added to the detection value of the roll angular velocity sensor 51 and the estimated value of roll angular velocity sensor offset $b_r$ in the case where no offset error is added to the detection value of the roll angular velocity sensor 51 is equal to the value (3 degs/s) of the offset error.

Note that the estimated values of yaw angular velocity sensor offset $b_y$, and vertical acceleration sensor offset $b_z$ are almost zero both in the case where no offset error is added to the detection value of the roll angular velocity sensor 51 and in the case where an offset error is added to the detection value of the roll angular velocity sensor 51.

Thus, it will be seen that the roll angle estimation device 10 of the present embodiment is able to estimate the roll angle $\varphi$ with high accuracy, even if the roll angular velocity sensor 51 has an offset error.

(6) Effects of the Embodiment

The roll angle estimation device 10 of the present embodiment estimates the roll angular velocity sensor offset $b_r$, yaw angular velocity sensor offset $b_y$, vertical acceleration sensor offset $b_z$, pitch angle $\theta$, and pitch angular velocity $\omega_p$, as well as the roll angle $\varphi$ and the vehicle speed $V_x$, and uses the estimated values of roll angular velocity sensor offset $b_r$, yaw angular velocity sensor offset $b_y$, vertical acceleration sensor offset $b_z$, pitch angle $\theta$, and pitch angular velocity $\omega_p$ in a next estimation operation. This compensates for a decrease in the accuracy of estimation of the roll angle $\varphi$ by utilizing results of estimation of the roll angular velocity sensor offset $b_r$, yaw angular velocity sensor offset $b_y$, and vertical acceleration sensor offset $b_z$, as well as the pitch angle $\theta$ and pitch angular velocity $\omega_p$. As a result, the roll angle $\varphi$ can be estimated with high accuracy.

Moreover, estimated values of offset errors of the roll angular velocity sensor 51 and the yaw angular velocity sensor 52, which are more susceptible to offsets than is an acceleration sensor, are used for the next estimation operation. This sufficiently improves the accuracy of estimation of the roll angle $\varphi$.

Furthermore, an estimated value of offset error of the vertical acceleration sensor 53 is used in the next estimation operation. This further improves the accuracy of estimation of the roll angle $\varphi$ in a range where the roll angle $\varphi$ is small.

Moreover, a detected value of rear-wheel speed $v_r$ as detected by the rear-wheel speed sensor 7 is used in the estimation operation. This makes it possible to estimate the roll angle $\varphi$ of the vehicle body 1, the roll angular velocity sensor offset $b_r$, the yaw angular velocity sensor offset $b_y$, the vertical acceleration sensor offset $b_z$, and the vehicle speed $V_x$ with high accuracy, even when the vehicle 100 turns in a small radius and with a low velocity.

Thus, the roll angle estimation device 10 estimates the roll angle $\varphi$ of the vehicle body 1 with high accuracy. As a result, the navigation system 12 and the headlight driver 15 operate accurately, on the basis of the roll angle $\varphi$ estimated by the ECU 20.

Figure 8:
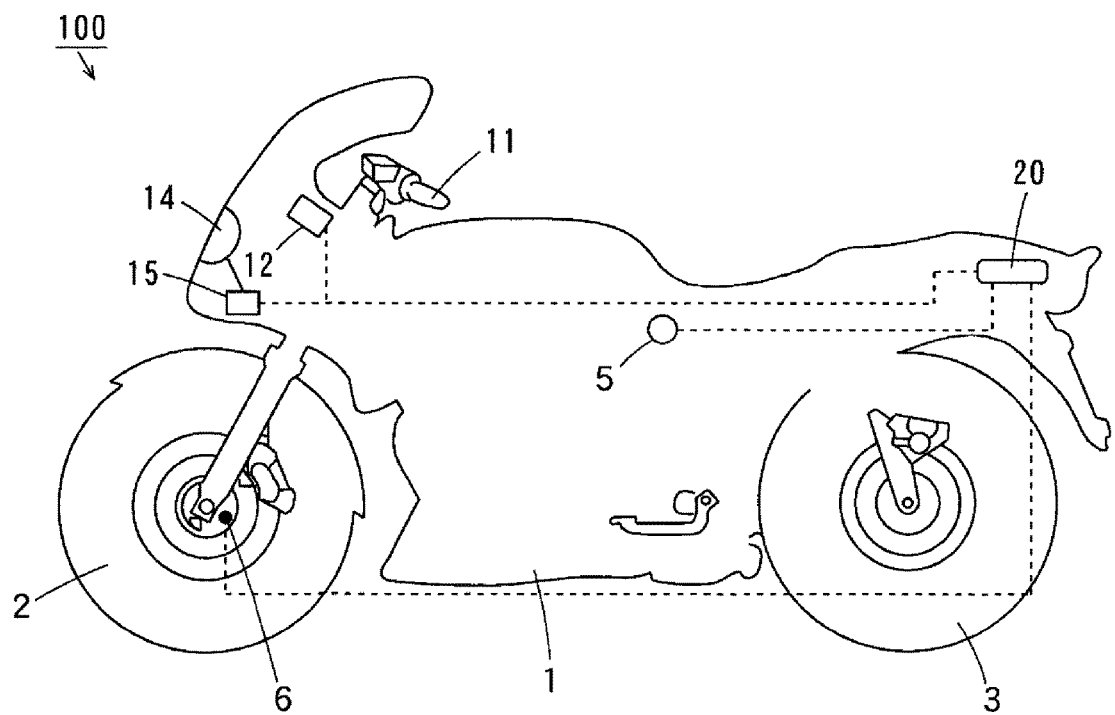
FIG. 8 is a schematic diagram of a vehicle including a roll angle estimation device according to another embodiment of the present invention.

(7) Other Embodiments (a) In the roll angle estimation device 10 according to the above-described embodiment, the rear-wheel speed sensor 7 for detecting the rotation speed of the rear wheel 3 is attached to the metal wheel of the rear wheel 3. Alternatively, instead of the rear-wheel speed sensor 7, a front-wheel speed sensor 6 for detecting the rotation speed of the front wheel 2 may be attached to the metal wheel of the front wheel 2, as shown in FIG. 8. FIG. 8 is a schematic diagram of a vehicle 100 including a roll angle estimation device according to another embodiment of the present invention. In other words, the above-described embodiment utilizes a rear-wheel speed $v_r$ which is detected by the rear-wheel speed sensor 7; instead of using the rear-wheel speed $v_r$ detected by the rear-wheel speed sensor 7, however, a rear-wheel speed $v_r$ may be estimated from the front-wheel speed which is detected by the front-wheel speed sensor 6 shown in FIG. 8.

When the vehicle 100 turns in a small radius and with a low velocity, the turning radius of the front wheel 2 becomes larger than the turning radius of the rear wheel 3. This makes the rotation speed of the front wheel 2 detected by the front-wheel speed sensor 6 higher than the rotation speed of the rear wheel 3. Accordingly, the ECU 20 estimates a rear-wheel speed $v_r$ from the rotation speed of the front wheel 2 which is detected by the front-wheel speed sensor 6.

Figure 9:
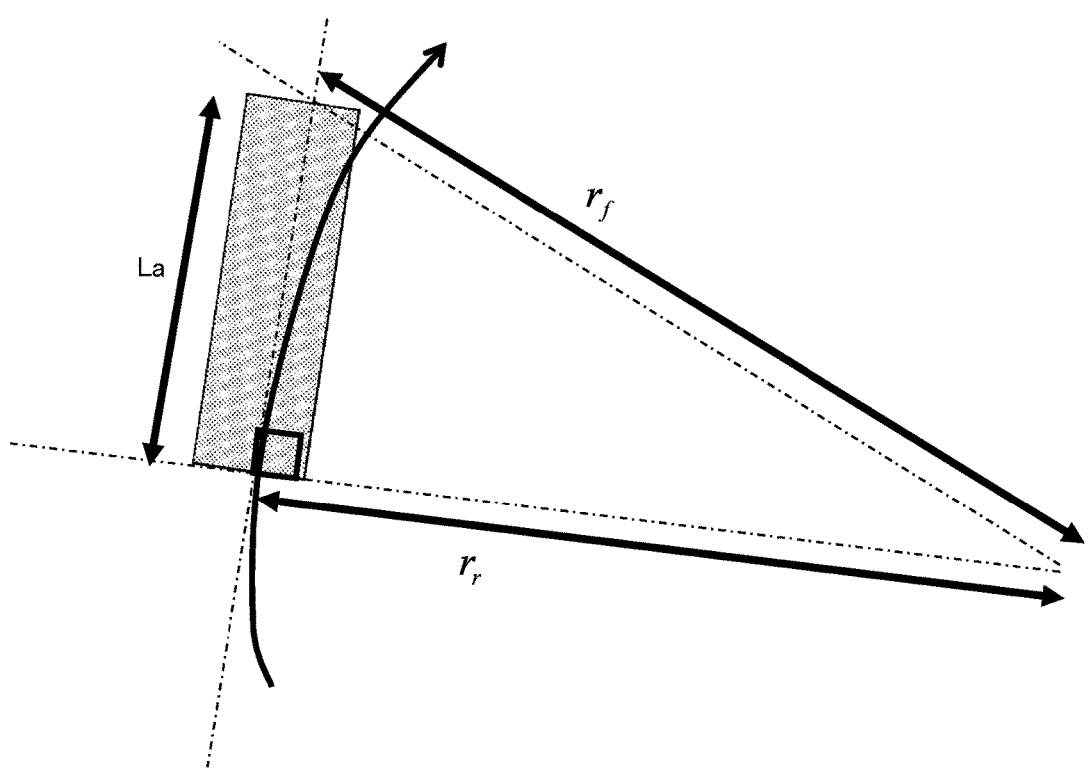
FIG. 9 is a diagram illustrating turning radii of a front wheel and a rear wheel of a turning vehicle.

FIG. 9 is a diagram illustrating turning radii of the front wheel 2 and the rear wheel 3 while the vehicle 100 turns. From assumption (b) above, the lateral skid velocity of the rear wheel 3 is zero, and thus the relationship of the following equation holds true between the turning radius $r_f$ of the front wheel 2 and the turning radius $r_r$ of the rear wheel 3.

[eq. 20]

$$r_f^2 = r_r^2 + La^2 \tag{20}$$

Herein, La is the wheelbase length of the vehicle 100. Eq. (20) gives the following equation.

[eq. 21]

$$\frac{r_f}{r_r} = \sqrt{1 + \frac{La^2}{r_r^2}} \tag{21}$$

The ratio between the velocity $V_f$ of the front wheel 2 at its tangential point and the velocity $V_r$ of the rear wheel 3 at its tangential point are equal to the ratio between the turning radius $r_f$ of the front wheel 2 and the turning radius $r_r$ of the rear wheel 3. Thus, the following equation holds true.

[eq. 22]

$$\frac{V_f}{V_r} = \frac{r_f}{r_r} = \sqrt{1 + \frac{La^2}{r_r^2}} \tag{22}$$

Furthermore, assuming that the vehicle 100 is steadily turning, the turning radius $r_r$ of the rear wheel 3 is expressed by the following equation, using the velocity $V_r$ of the rear wheel 3 at its tangential point and the roll angle $\varphi$.

[eq. 23]

$$r_r = \frac{V_r^2}{g\tan\phi} \tag{23}$$

In eq. (23) above, g is the magnitude of gravitational acceleration. Substituting eq. (23) above into eq. (22) above gives the following equation.

[eq. 24]

$$V_r^4 - V_f^2 V_r^2 + La^2 g^2 \tan^2\phi = 0 \quad (24)$$

From eq. (24) above, the velocity $V_r$ of the rear wheel 3 at its tangential point is expressed by the following equation.

[eq. 25]

$$V_r = \sqrt{\frac{V_f^2 + \sqrt{V_f^4 - 4La^2 g^2 \tan^2\phi}}{2}} \quad (25)$$

Eq. (25) above has a solution only when the condition of the following equation is satisfied.

[eq. 26]

$$V_f^4 - 4La^2 g^2 \tan^2\phi \geq 0 \quad (26)$$

When the turning radius of the vehicle 100 is small, there may be cases where the condition of eq. (26) above is not satisfied. Eq. (25) above is modified into the following equation, so that there will be a solution even in such cases.

[eq. 27]

$$\begin{cases} \sqrt{\dfrac{V_f^2 + \sqrt{V_f^4 - 4La^2 g^2 \tan^2\phi}}{2}} & \text{(when } V_f^4 \geq 4La^2 g^2 \tan^2\phi\text{)} \\ \dfrac{V_f}{\sqrt{2}} & \text{(when } V_f^4 < 4La^2 g^2 \tan^2\phi\text{)} \end{cases} \quad (27)$$

As the roll angle $\varphi$ in eq. (27) above, the estimated value of the roll angle $\varphi$ from the previous estimation operation is used.

From eq. (27) above, the relationship between the velocity $V_f$ of the front wheel 2 at its tangential point and the velocity $V_r$ of the rear wheel 3 at its tangential point is determined. Therefore, the rear-wheel speed $V_r$ can be calculated from the rotation speed of the front wheel 2 detected by the front-wheel speed sensor 6 (hereinafter referred to as the front-wheel speed $V_f$).

Figure 10:
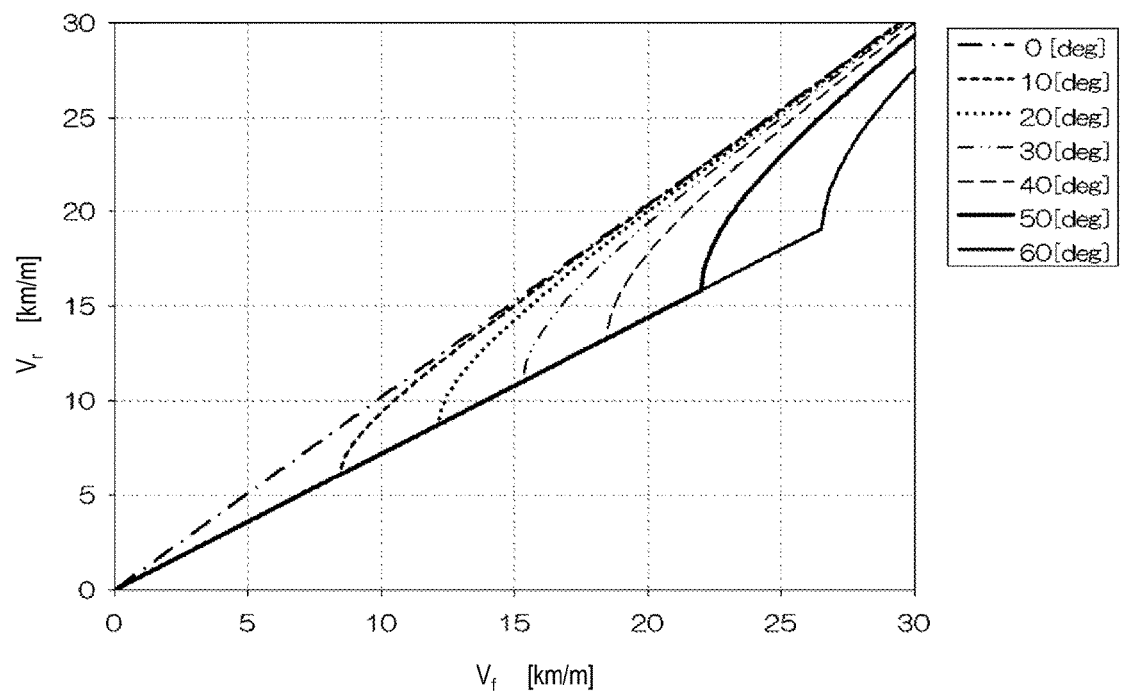
FIG. 10 is a diagram showing results of calculating a relationship between front-wheel speed and rear-wheel speed.

FIG. 10 is a diagram showing results of calculating the relationship between the front-wheel speed $V_f$ and the rear-wheel speed $V_r$. In FIG. 10, the vertical axis represents the rear-wheel speed $V_r$, and the horizontal axis represents the front-wheel speed $V_f$.

As shown in FIG. 10, the rear-wheel speed $V_r$ can be estimated from the front-wheel speed $V_f$ which is detected by the front-wheel speed sensor 6. Therefore, even when only the front-wheel speed sensor 6 is provided, it is possible to estimate the roll angle $\varphi$ of the vehicle body 1, the vehicle speed $V_x$, the roll angular velocity sensor offset $b_r$, the yaw angular velocity sensor offset $b_y$, and the vertical acceleration sensor offset $b_z$ with high accuracy, similarly to the case where the rear-wheel speed sensor 7 is provided.

(b) Instead of the roll angular velocity sensor 51 and yaw angular velocity sensor 52 in the above-described embodiment, two or more angular velocity sensors may be used which detect angular velocity around two or more axes other than the longitudinal direction and the vertical direction of the vehicle 100. In this case, detection values by the two or more angular velocity sensors may be converted into a roll angular velocity $\omega_r$ and a yaw angular velocity $\omega_y$, by a geometric technique, so that eqs. (16) and (17) above can be used.

(c) In addition to the roll angular velocity sensor 51 and yaw angular velocity sensor 52 of the above-described embodiment, an angular velocity sensor which detects angular velocity around an axis in the lateral direction of the vehicle 100 may be used. In this case, the accuracy of estimation of the roll angle $\varphi$ is further improved.

(d) Instead of the vertical acceleration sensor 53, the longitudinal acceleration sensor 54, and the lateral acceleration sensor 55 in the above-described embodiment, three or more acceleration sensors may be used which detect acceleration along three or more directions other than the vertical direction, the longitudinal direction, and the lateral direction of the vehicle 100. In this case, detection values by the three or more acceleration sensors may be converted into a vertical acceleration $G_z$, a longitudinal acceleration $G_x$, and a lateral acceleration $G_y$, by a geometric technique, so that eqs. (16) and (17) above can be used.

(e) In the above-described embodiment, a roll angular velocity sensor offset $b_r$, and a yaw angular velocity sensor offset $b_y$, are estimated by the Kalman filter 80; however, this is not a limitation. Only the roll angular velocity sensor offset $b_r$, may be estimated, or only the yaw angular velocity sensor offset $b_y$, may be estimated. In the case where only the roll angular velocity sensor offset $b_r$, is estimated, calculation may be performed on the assumption that the values of the other sensor offsets are zero. Similarly, in the case where only the yaw angular velocity sensor offset $b_y$, is estimated, calculation may be performed on the assumption that the values of the other sensor offsets are zero.

(f) Although the above-described embodiment estimates a vertical acceleration sensor offset $b_z$, this is not a limitation. An offset error of the longitudinal acceleration sensor 54 may be estimated, or an offset error of the lateral acceleration sensor 55 may be estimated.

(g) Although the above-described embodiment employs rear-wheel speed $V_r$ as one of the input parameters of the Kalman filter 80, this is not a limitation. Vehicle speed as detected by a velocity sensor which is capable of measuring the velocity of travel (vehicle speed) of the vehicle 100 may be used as one of the input parameters of the Kalman filter 80.

(h) In the above-described embodiment, the Kalman filter 80 estimates vehicle speed $V_x$. However, in the case where a velocity sensor detects vehicle speed, for example, the Kalman filter 80 does not need to estimate vehicle speed $V_x$.

(i) Although the Kalman filter 80 is realized by the ECU 20 and a computer program in the above-described embodiment, this is not a limitation. Some or all functions of the Kalman filter 80 may be implemented by hardware, e.g., an electronic circuit.

(j) Instead of the Kalman filter 80 in the above-described embodiment, any other adaptive filtering technique may be used. For example, an LMS (least mean square) adaptive filter, H∞ filtering, or the like may be used.

(k) Although the roll angle estimation device 10 is applied to a motorcycle in the above-described embodiment, this is not a limitation. The roll angle estimation device is applicable to various transport apparatuses, such as any other four-wheeled or three-wheeled automobiles or other vehicles, or marine vessels.

(l) In the above-described embodiment, the roll angle $\varphi$ which is estimated by the roll angle estimation device 10 is used for the navigation system 12 and the headlight driver 15; however, this is not a limitation. The roll angle $\varphi$ which is estimated by the roll angle estimation device 10 may be used for various processes, including other control functions of the transport apparatus.

(8) Correspondence Between Component Elements of the Claims and Elements in the Embodiment Exemplary correspondence the component elements of the claims and the elements of the embodiment will be described below. However, the present invention is not limited to the example below.

In the above-described embodiment, the axis along the longitudinal direction of the vehicle 100 is an example of the first axis; the axis along the vertical direction of the vehicle 100 is an example of the second axis; roll angular velocity $\omega_r$ is an example of the first angular velocity; yaw angular velocity $\omega_y$ is an example of the second angular velocity; the roll angular velocity sensor 51 is an example of the first angular velocity detector; and the yaw angular velocity sensor 52 is an example of the second angular velocity detector.

Moreover, the first direction is an example of the vertical direction of the vehicle 100; the second direction is an example of the longitudinal direction of the vehicle 100; the third direction is an example of the lateral direction of the vehicle 100; vertical acceleration $G_z$ is an example of the first acceleration; longitudinal acceleration $G_x$ is an example of the second acceleration; lateral acceleration $G_y$ is an example of the third acceleration; the vertical acceleration sensor 53 is an example of the first acceleration detector; the longitudinal acceleration sensor 54 is an example of the second acceleration detector; and the lateral acceleration sensor 55 is an example of the third acceleration detector.

Furthermore, rear-wheel speed $V_r$ or front-wheel speed $V_f$ is an example of the information concerning moving velocity; the rear-wheel speed sensor 7 or the front-wheel speed sensor 6 is an example of the velocity detector; and the ECU 20 is an example of the estimation section, which is also referred to as an arithmetic circuitry.

Moreover, the vehicle 100 or the vehicle body 1 is an example of the moving body; the front wheel 2 is an example of the front wheel; the rear wheel 3 is an example of the rear wheel; the rear-wheel speed sensor 7 is an example of the rear-wheel speed detector; the front-wheel speed sensor 6 is an example of the front-wheel rotation speed detector; and the ECU 20 is an example of the rear-wheel rotation speed estimation section, which is also referred to as rear-wheel rotation speed arithmetic circuitry.

Moreover, low-pass filters 63, 64, and 65 are an example of the first, second, and third low-pass filters; and the Kalman filter 80 realized by the ECU 20 and a computer program is an example of the Kalman filter. The navigation system 12 or the headlight driver 15 is an example of the processing device.

Various other elements having the construction or function described in the claims may also be used as component elements of the claims.

The present invention can be used for the estimation of the roll angle of a transport apparatus or the like.

The present invention, or the pertinent component, may take the form of an entirely hardware embodiment, an entirely software embodiment (including firmware, resident software, micro-code, etc.) or an embodiment combining software and hardware aspects that may all generally be referred to herein as a "circuit," "module" or "system."

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A roll angle estimation device for estimating a roll angle of a moving body, comprising:
   first and second angular velocity detectors which detect a roll angular velocity and a yaw angular velocity respectively around first and second axes and along two mutually different directions;
   first, second, and third acceleration detectors which respectively detect first, second, and third accelerations along three mutually different directions;
   a velocity detector which detects information concerning a moving velocity of the moving body in a direction of travel of the moving body; and
   arithmetic circuitry configured to estimate
      a current value of the roll angle of the moving body,
      a current value of a pitch angle of the moving body,
      a current value of a pitch angular velocity of the moving body, and
      a current value of at least one offset error of the first and second angular velocity detectors and the first, second, and third acceleration detectors, based on:
         detection values of the roll angular velocity and the yaw angular velocity by the first and second angular velocity detectors;
         detection values of the first, second, and third accelerations by the first, second, and third acceleration detectors;
         a detection value of the information by the velocity detector;
         estimated previous values, from a previous estimation operation of the arithmetic circuitry, of the roll angle, the pitch angle, and the pitch angular velocity; and
         an estimated previous value of the at least one offset error from the previous estimation operation of the arithmetic circuitry, wherein
   the arithmetic circuitry estimates the current value of the pitch angle and the pitch angular velocity of the moving body by integrating $$\frac{d}{dt}\begin{bmatrix} \theta \\ \omega_p \end{bmatrix} = \begin{bmatrix} \omega_p \\ (-1/\tau)*\omega_p \end{bmatrix}$$

wherein
      $\theta$ is the pitch angle,
      $\omega_p$ is the pitch angular velocity,
      $(1/\tau)$ represents an exponential decay factor of the pitch angular velocity;
   wherein the arithmetic circuitry comprises a Kalman filter which estimates the estimated current values for the roll angle, the pitch angle, the pitch angular velocity and the at least one offset error, and the Kalman filter is extended by application of an observation equation that calculates a value of vertical acceleration $G_z$, a value of lateral acceleration $G_y$ and a value of rear-wheel speed $v_r$ based on at least the estimated value of the pitch angle $\theta$ and the estimated value of the pitch angular velocity $\omega_p$.

2. The roll angle estimation device of claim 1, wherein the Kalman filter estimates the estimated current values for the roll angle, the pitch angle, the pitch angular velocity and the at least one offset error based on a relationship among:
- the detection values by the first and second angular velocity detectors;
- the detection values by the first, second, and third acceleration detectors;
- the detection value of the information by the velocity detector;
- the estimated previous values from the previous estimation operation of the roll angle, the pitch angle, and the pitch angular velocity; and
- the estimated previous value of the at least one offset error from the previous estimation operation.

3. The roll angle estimation device of claim 1, wherein the arithmetic circuitry estimates the estimated current value of the pitch angle based on an estimated previous value of the pitch angular velocity from the previous estimation operation, and estimates the estimated current value for the pitch angular velocity based on the estimated previous value of the pitch angular velocity from the previous estimation operation.

4. The roll angle estimation device of claim 3, wherein the Kalman filter estimates the estimated current values for the roll angle, the pitch angle, the pitch angular velocity and the at least one offset error based on a relationship among:
- the detection values by the first and second angular velocity detectors;
- the detection values by the first, second, and third acceleration detectors;
- the detection value of the information by the velocity detector;
- the estimated previous values from the previous estimation operation of the roll angle, the pitch angle, and the pitch angular velocity; and
- the estimated previous value of the at least one offset error from the previous estimation operation.

5. The roll angle estimation device of claim 1, wherein the arithmetic circuitry estimates the current value for the pitch angle by integrating an estimated previous value of the pitch angular velocity over a period of time since the previous estimation operation.

6. The roll angle estimation device of claim 5, wherein the Kalman filter estimates the estimated current values of the roll angle, the pitch angle, the pitch angular velocity and the at least one offset error based on a relationship among:
- the detection values by the first and second angular velocity detectors;
- the detection values by the first, second, and third acceleration detectors;
- the detection value of the information by the velocity detector;
- the estimated previous values from the previous estimation operation of the roll angle, the pitch angle, and the pitch angular velocity; and
- the estimated previous value of the at least one offset error from the previous estimation operation.

7. The roll angle estimation device of claim 2, wherein the Kalman filter comprises a saturation limiting circuit which,
- when any of the estimated current values exceed an upper limit value of a predetermined range, sets the estimated current value, that exceeds the upper limit value, with the upper limit value, and
- when any of the estimated current values is lower than a lower limit value of the predetermined range, sets the estimated current value, that is lower than the lower limit value, with the lower limit value.

8. The roll angle estimation device of claim 7, wherein
- one of the estimated current values exceeds the upper limit value of the predetermined range, so that the saturation limiting circuit sets the one estimated value with the upper limit value, and
- the one estimated current value is one selected from the group consisting of the estimated current value of the roll angle, the estimated current value of the pitch angle, and an offset error of the pitch angular velocity.

9. The roll angle estimation device of claim 7, wherein
- one of the estimated current values is lower than the lower limit value of the predetermined range, so that the saturation limiting circuit sets the one estimated value with the lower limit value,
- the one estimated current value is one selected from the group consisting of the estimated current value of the roll angle, the estimated current value of the pitch angle, and an offset error of the pitch angular velocity.

10. The roll angle estimation device of claim 2, wherein the arithmetic circuitry includes low-pass filters that receive outputs from the first and second angular velocity detectors, the first, second, and third acceleration detectors, and the velocity detector, and
- the arithmetic circuitry treats filtered outputs, that have been transmitted through the low-pass filters, as, respectively, the detection values of the first and second angular velocity detectors, the first, second, and third accelerations detector, and said velocity detector.

11. The roll angle estimation device of claim 1, wherein, the moving body includes a front wheel and a rear wheel;
- said velocity detector includes a rear-wheel rotation speed detector which detects a rotation speed of the rear wheel as the information concerning the moving velocity of the moving body in the direction of travel of the moving body; and
- the arithmetic circuitry further estimates the moving velocity of the moving body, and estimates the current value of the roll angle of the moving body, the current value of the at least one offset error, and a current value of the moving velocity of the moving body, based on:
  - the detection values of the roll angular velocity and the yaw angular velocity by the first and second angular velocity detectors;
  - the detection values of the first, second, and third accelerations by the first, second, and third acceleration detectors;
  - a detection value of the rotation speed by the rear-wheel rotation speed detector;
  - an estimated previous value of the roll angle from the previous estimation operation;
  - the estimated previous value of the at least one offset error from the previous estimation operation; and
  - an estimated previous value of the moving velocity from the previous estimation operation.

12. The roll angle estimation device of claim 1, wherein, the moving body includes a front wheel and a rear wheel; said velocity detector includes
- a front-wheel rotation speed detector which detects a rotation speed of the front wheel, and
- a rear-wheel rotation speed arithmetic circuitry which estimates a rotation speed of the rear wheel from a detection value of the rotation speed of the front wheel by the front-wheel rotation speed detector as the information concerning the moving velocity of the moving body in the direction of travel of the moving body; and the arithmetic circuitry further estimates the moving velocity of the moving body, and estimates the current value of the roll angle of the moving body, the current value of the at least one offset error, and a current value of the moving velocity of the moving body, based on:

the detection values of the first, second, and third accelerations by the first and second angular velocity detectors;

the detection values of the first, second, and third accelerations by the first, second, and third acceleration detectors;

an estimated value of the rotation speed of the rear wheel by the rear-wheel rotation speed arithmetic circuitry;

an estimated previous value of the roll angle from the previous estimation operation;

the estimated previous value of the at least one offset error from the previous estimation operation; and an estimated previous value of the moving velocity from the previous estimation operation.

13. A transport apparatus comprising:
the moving body of claim 1;
the roll angle estimation device of claim 1 which estimates the roll angle of the moving body; and
a processing device which controls the transport apparatus using the roll angle estimated by the roll angle estimation device.

14. The roll angle estimation device of claim 1, wherein the arithmetic circuitry comprises a saturation limiting circuit which, for each respective estimated current value of the estimated current values, determines whether the respective estimated current value exceeds an upper limit value of a predetermined range, and sets the respective estimated current value with the upper limit value when the respective estimated current value exceeds the upper limit value.

15. The roll angle estimation device of claim 1, wherein the arithmetic circuitry comprises a saturation limiting circuit which, for each respective estimated current value of the estimated current values, determines whether the respective estimated current value is lower than a lower limit value of a predetermined range, and sets the respective estimated current value with the lower limit value when the respective estimated current value is less than the lower limit value.

16. The roll angle estimation device of claim 12, wherein the arithmetic circuitry estimates the rotation speed $V_r$ of the rear wheel at a point where the rear wheel contacts a road surface, using $$V_r = \sqrt{\frac{V_f^2 + \sqrt{V_f^4 - 4La^2 g^2 \tan^2 \phi}}{2}},$$

wherein
$V_f$ is the rotation speed of the front wheel at a point where the front wheel contacts the road surface,
La is a wheelbase length of the moving body,
g is the magnitude of gravitational acceleration,
$\phi$ is the estimated previous value of the roll angle from the previous estimation operation, and $$V_f^4 \geq 4La^2 g^2 \tan^2 \phi.$$

17. The roll angle estimation device of claim 16, wherein the arithmetic circuitry further estimates the rotation speed $V_r$ of the rear wheel at the point where the rear wheel contacts the road surface using $V_f/\sqrt{2}$, when $V_f^4 < 4La^2 g^2 \tan^2 \phi$.

18. The roll angle estimation device of claim 1, wherein the at least one offset error includes a roll angular velocity sensor offset $b_r$, a yaw angular velocity sensor offset $b_y$, and a vertical acceleration sensor offset $b_z$, and the extending of the Kalman filter takes into account the roll angular velocity sensor offset $b_r$, the yaw angular velocity sensor offset $b_y$, and the vertical acceleration sensor offset $b_z$.

* * * * *